United States Patent
Seo et al.

(10) Patent No.: US 7,725,010 B2
(45) Date of Patent: May 25, 2010

(54) METHOD AND APPARATUS OF REPRODUCING DATA RECORDED ON RECORDING MEDIUM AND LOCAL STORAGE

(75) Inventors: Kang Soo Seo, Anyang-si (KR); Jea Yong Yoo, Seoul (KR); Byung Jin Kim, Seongnam-si (KR); Seung Hoon Lee, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1154 days.

(21) Appl. No.: 11/205,144

(22) Filed: Aug. 17, 2005

(65) Prior Publication Data

US 2006/0039258 A1    Feb. 23, 2006

Related U.S. Application Data

(60) Provisional application No. 60/601,993, filed on Aug. 17, 2004.

(30) Foreign Application Priority Data

Sep. 7, 2004  (KR) ....................... 10-2004-0071367
Sep. 9, 2004  (KR) ....................... 10-2004-0072147

(51) Int. Cl.
*H04N 5/00* (2006.01)

(52) U.S. Cl. ................... 386/126; 386/46; 386/124; 386/125

(58) Field of Classification Search ............. 386/46, 386/69, 95, 96, 98, 124–126, 55, 83; 707/104.1
See application file for complete search history.

(56) References Cited

U.S. PATENT DOCUMENTS 5,644,782 A     7/1997    Yeates et al.

(Continued)

FOREIGN PATENT DOCUMENTS

CA          2373641          9/2001

(Continued)

OTHER PUBLICATIONS

Chinese Office Action corresponding to Chinese Application No. 200580031490.0 dated Aug. 8, 2008.

(Continued)

*Primary Examiner*—Thai Tran
*Assistant Examiner*—Mishawn Dunn
(74) *Attorney, Agent, or Firm*—Harness, Dickey & Pierce, P.L.C.

(57) ABSTRACT

An apparatus for reproducing data recorded on a recording medium includes a pick-up unit, a local storage, and a decoder. The pick-up unit reads main data recorded on the recording medium, and the local storage stores sub data associated with the main data. The sub data may include interactive graphic streams or text subtitle streams. The decoder decodes the main data and the sub data using a PlayList which includes a main path and a sub path. The main path contains a PlayItem for play-back of the main data, and the sub path contains at least one SubPlayItem associated with the PlayItem for play-back of the sub data in association with the play-back of the main data. The PlayList file further includes sub path type information which indicates whether the SubPlayItem included in the sub path is synchronized with the PlayItem.

30 Claims, 36 Drawing Sheets

U.S. PATENT DOCUMENTS

| | | | |
|---|---|---|---|
| 5,930,768 A | 7/1999 | Hooban | |
| 5,982,980 A | 11/1999 | Tada | |
| 6,021,438 A | 2/2000 | Duvvoori et al. | |
| 6,269,371 B1 | 7/2001 | Ohnishi | |
| 6,775,803 B1 | 8/2004 | Chung et al. | |
| 6,928,613 B1 | 8/2005 | Ishii et al. | |
| 7,308,189 B2 | 12/2007 | Ando et al. | |
| 2002/0161571 A1 | 10/2002 | Matsushima et al. | |
| 2003/0072453 A1 | 4/2003 | Kelly et al. | |
| 2003/0105743 A1 | 6/2003 | Ireton | |
| 2003/0190148 A1 | 10/2003 | Lee | |
| 2003/0202431 A1 | 10/2003 | Kim et al. | |
| 2003/0228134 A1 | 12/2003 | Kim et al. | |
| 2003/0235402 A1 | 12/2003 | Seo et al. | |
| 2003/0235406 A1 | 12/2003 | Seo et al. | |
| 2004/0047588 A1 | 3/2004 | Okada et al. | |
| 2004/0051812 A1 | 3/2004 | Hayward | |
| 2004/0054541 A1 | 3/2004 | Kryze et al. | |
| 2004/0081434 A1* | 4/2004 | Jung et al. | 386/95 |
| 2004/0101285 A1 | 5/2004 | Seo et al. | |
| 2004/0184778 A1* | 9/2004 | Jung et al. | 386/95 |
| 2004/0210584 A1 | 10/2004 | Nir et al. | |
| 2004/0235402 A1 | 11/2004 | Bjelopavlic et al. | |
| 2005/0025461 A1* | 2/2005 | Kato et al. | 386/95 |
| 2005/0105888 A1 | 5/2005 | Hamada et al. | |
| 2005/0108466 A1 | 5/2005 | Takashima et al. | |
| 2005/0196142 A1* | 9/2005 | Park et al. | 386/95 |
| 2005/0198071 A1* | 9/2005 | Yoo et al. | 707/104.1 |
| 2005/0198115 A1 | 9/2005 | Sugimoto et al. | |
| 2006/0013562 A1 | 1/2006 | Sugino et al. | |
| 2006/0045481 A1 | 3/2006 | Yahata et al. | |
| 2006/0051062 A1 | 3/2006 | Kusaka et al. | |
| 2006/0140079 A1 | 6/2006 | Hamada et al. | |
| 2006/0143666 A1 | 6/2006 | Okada et al. | |
| 2006/0153535 A1 | 7/2006 | Chun et al. | |
| 2006/0227973 A1 | 10/2006 | Takashima et al. | |
| 2006/0282775 A1* | 12/2006 | Yahata et al. | 715/716 |
| 2007/0217305 A1 | 9/2007 | Seo et al. | |

FOREIGN PATENT DOCUMENTS

| | | |
|---|---|---|
| CN | 1111873 | 11/1995 |
| CN | 1179589 | 4/1998 |
| CN | 1898742 A | 1/2007 |
| EP | 0 737 912 | 10/1996 |
| EP | 0 737 975 | 10/1996 |
| EP | 0 801 384 | 10/1997 |
| EP | 1 032 229 | 8/2000 |
| EP | 1 408 505 | 4/2004 |
| EP | 1408505 * | 4/2004 |
| EP | 1426961 A1 | 6/2004 |
| EP | 1437737 A2 | 7/2004 |
| EP | 1 513 152 | 3/2005 |
| EP | 1 524 669 | 4/2005 |
| EP | 1 536 427 | 6/2005 |
| EP | 1 553 769 | 7/2005 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002288941 | 10/2002 |
| JP | 2004-214918 | 7/2004 |
| JP | 2006-040473 | 2/2006 |
| KR | 10-2004-0039885 | 5/2004 |
| RU | 2233011 | 7/2004 |
| TW | 583538 | 4/2004 |
| WO | WO 95/12197 | 5/1995 |
| WO | WO 96/11446 | 4/1996 |
| WO | WO 01/67668 | 9/2001 |
| WO | WO 2004/001752 | 12/2003 |
| WO | WO 2004/001754 | 12/2003 |
| WO | WO 2004/023479 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2005/002220 | 6/2004 |
| WO | WO 2004/074976 | 9/2004 |
| WO | WO 2004/077436 | 9/2004 |
| WO | WO 2005/052941 | 9/2004 |
| WO | WO 2004/114658 | 12/2004 |
| WO | WO 2005/078727 | 2/2005 |
| WO | WO 2005/050528 | 6/2005 |
| WO | WO 2005/055205 | 6/2005 |
| WO | WO 2005/091637 | 9/2005 |
| WO | WO 2005/124763 | 12/2005 |

OTHER PUBLICATIONS

European Search Report corresponding to European Application No. 05787044.6 dated Jan. 29, 2009.

International Search report for PCT/KR 2005/002696 dated Dec. 5, 2005.

International Search report for PCT/KR 2005/002698 dated Dec. 5, 2005.

International Search report for PCT/KR 2005/002704 dated Dec. 30, 2005.

International Search report for PCT/KR 2005/002700 dated Jan. 13, 2006.

Office Action for Chinese Application 1111873 dated May 8, 2009 and English translation thereof.

Office Action for Chinese Application 1179589 dated May 8, 2009 and English translation thereof.

Notice of Allowance for Russian Application 2233011 dated Apr. 28, 2009 and English translation thereof.

* cited by examiner

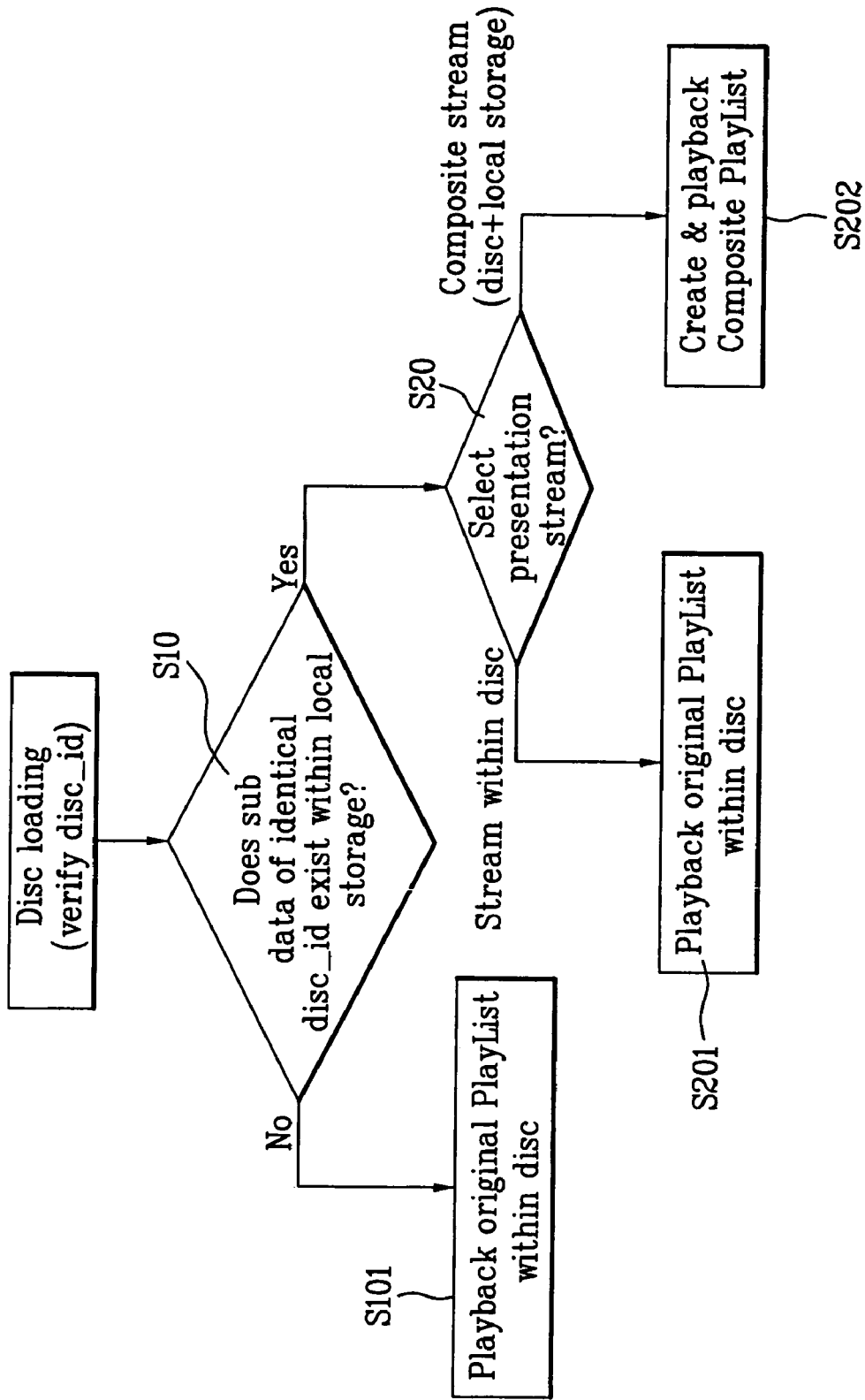

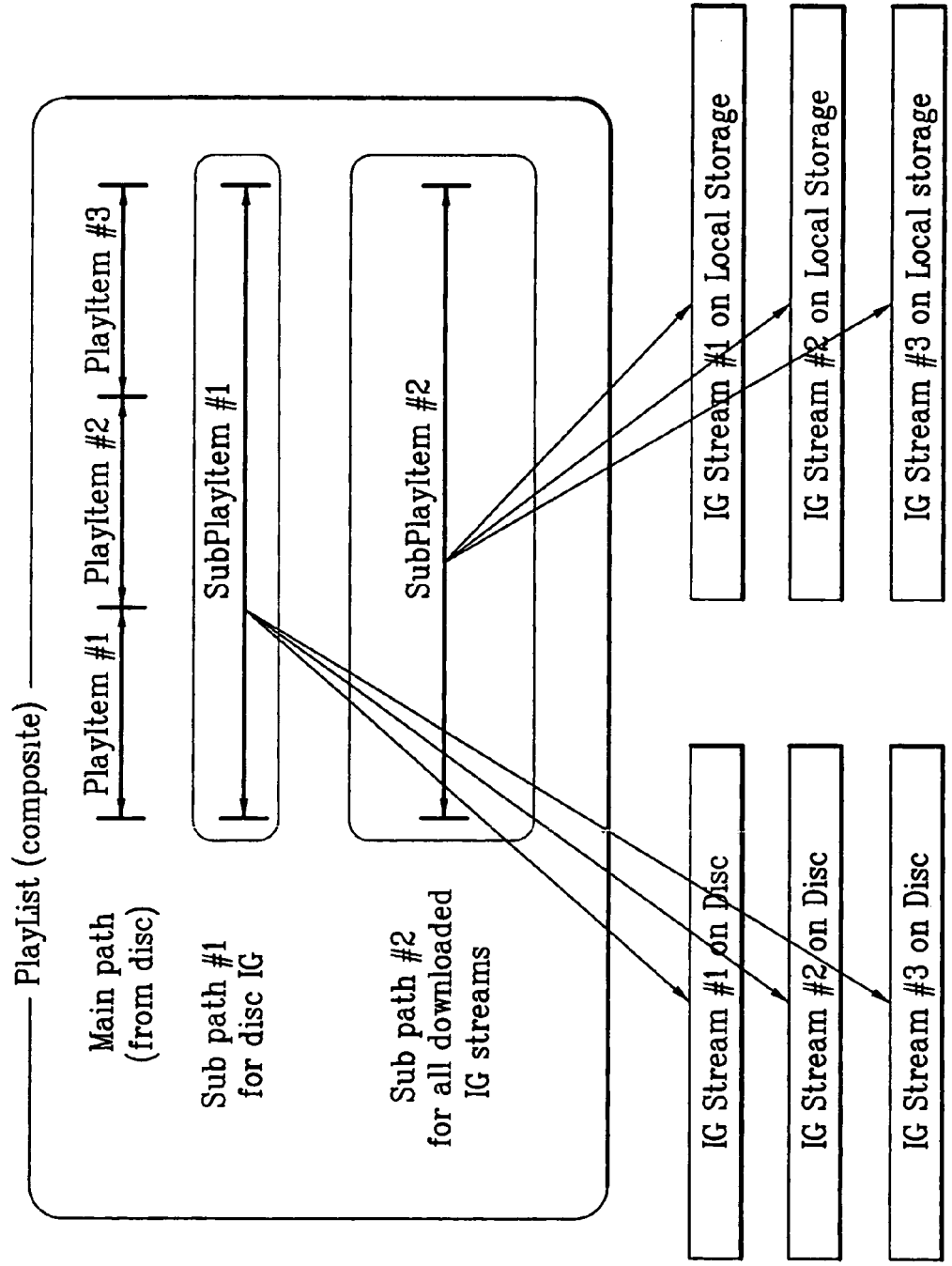

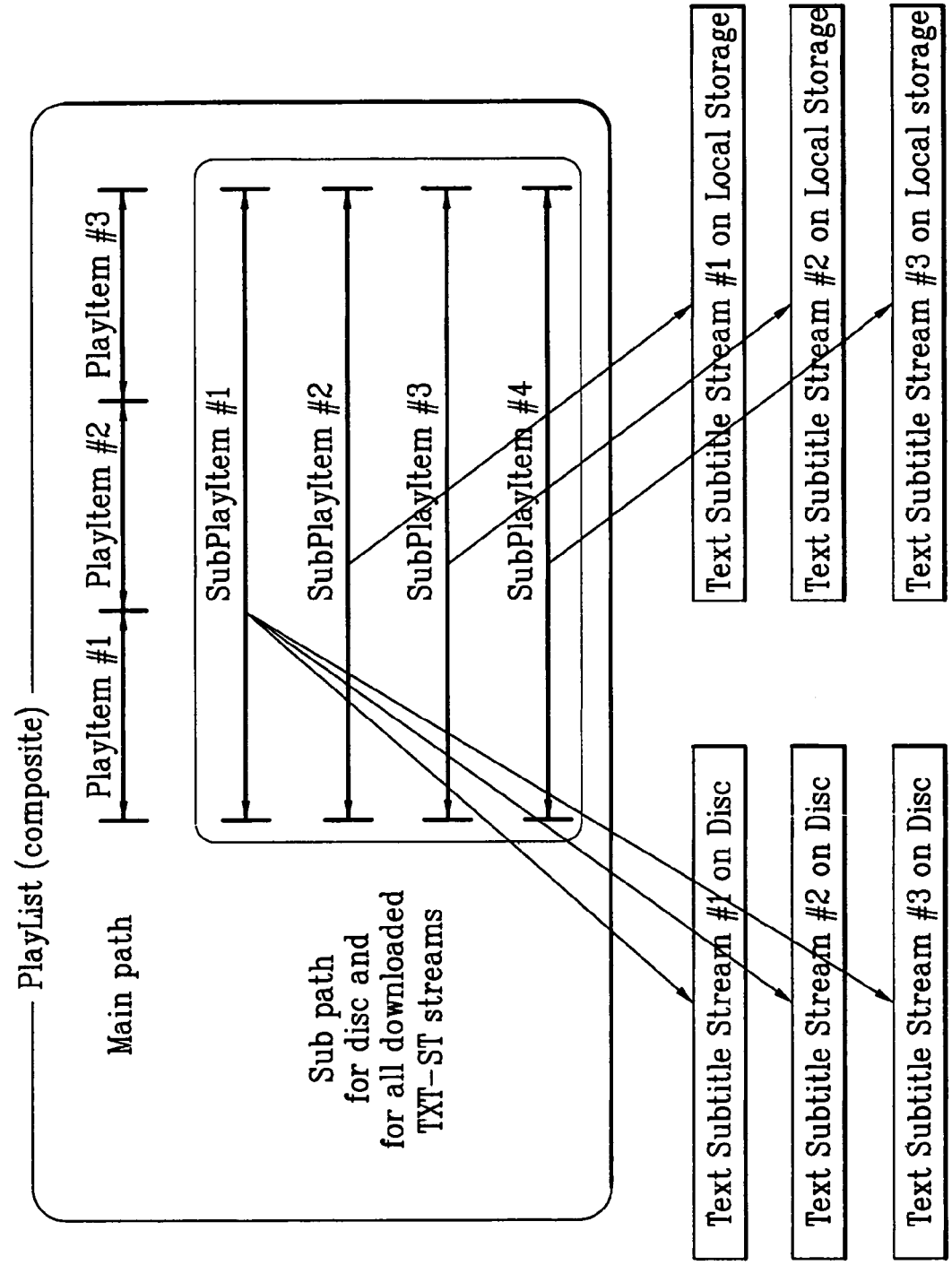

FIG. 11A

```
xxxxx.mpls{
    type_indicator
    version_number
    PlayList_start_address
    PlayListMark_start_address
    reserved_for_future_use
    AppInfoPlayList()
    for(i=0; i<N1; i++) {
            padding_word
    }
    PlayList()
    for(i=0; i<N2; i++) {
            padding_word
    }
    PlayListMark()
    for(i=0; i<N2; i++) {
            padding_word
    }
}
```

FIG. 11B

```
PlayList() {
    length
    reserved_for_future_use
    number_of_PlayItems
    number_of_SubPaths
    for (PlayItem_id=0;
        PlayItem_id<number_of_PlayItems;
        PlayItem_id++) {
            PlayItem() ← STN_table()
    }
    for(SubPath_id=0;
        SubPath_id<number_of_SubPaths;
        SubPath_id++) {
            SubPath()
    }
}
```

FIG. 11C

```
STN_table() {
  length
  reserved_for_future_use
  number_of_video_stream_entries
  number_of_audio_stream_entries
  number_of_PG_textST_stream_entries
  number_of_IG_stream_entries
  reserved_for_future_use
  for (video_stream_id=0;
       video_stream_id<number_of_video_stream_entries;
       video_stream_id++) {
          stream_entry()
          stream_attributes()
  }
  for (audio_stream_id=0;
       audio_stream_id<number_of_audio_ stream_entries;
       audio_stream_id++) {
          stream_entry()
          stream_attributes()
  }
  for (PG_textST_id=0;
       PG_textST_id<number_of_PG_textST_ stream_entries;
       PG_textST_stream_id++) {
          stream_entry()
          stream_attributes()
  }
  for (IG_stream_id=0;
       IG_stream_id<number_of_IG_stream_entries
       IG_stream_id++) {
          stream_entry()
          stream_attributes()
  }
}
```

FIG. 11D

```
stream_entry()
    length
    type
    if (type==1) {
                ref_to_stream_PID_of_mainClip
                reserved_for_future_ue
    } else if (type==2 or 3) {
        ref_to_SubPath_id
        ref_to_SubClip_entry_id
        ref_to_Stream_PID_of_subClip
        reserved_for_future_use
    }
}
``` type 1 : a stream of the clip used by the PlayItem  
type 2 : a stream of the clip used by a SubPath recorded in disc.  
type 3 : a stream of the clip used by a SubPath stored in local storage.

FIG. 11E

```
stream_attributes() {
  length
  stream_coding_type
  if(stream_doding_type==0x02) {
          reserved_for_future_use
          frame_rate
          reserved_for_future_use
  } else if (stream_coding_type==0x80 ||
          stream_coding_type==0x81 ||
          stream_coding_type==0x82) {
          audio_presentation_type
          reserved_for_future_use
          audio_language_code
  } else if (stream_coding_type==0x90) {
                  //Presentation graphics stream
          PG_languge_code
  } else if (stream_coding_type==0x91) {
                  //Interactive graphics stream
          IG_languge_code
  } else if (stream_coding_type==0x92) {
                  //Text subtitle stream
          character_code
          reserved_for_future_use
          textST_language_code
  }
}
```

FIG. 11F

```
SubPath() {
    length
    reserved_for_future_use
    SubPath_type
    reserved_for_future_use
    is_repeat_SubPath
    reserved_for_future_use
    number_of_SubPlayItems
    for (i=0; i<number_of_SubPlayItems; i++) {
        SubPlayItem(i)
    }
}
```

SubPath_type (n: recorded in disc, m: stored in local storage)
n1 : Audio presentation path
n2 : Text subtitle presentation path
n3 : Interactive graphics presentation path
    (asynchronous with AV stream)
n4 : Presentation graphics presentation path
n5 : Interactive graphics presentation path
    (synchronous with AV stream)
m1 : Audio presentation path
m2 : Text subtitle presentation path
m3 : Interactive graphics presentation path
    (asynchronous with AV stream)
m4 : Presentation graphics presentation path
m5 : Interactive graphics presentation path
    (synchronous with AV stream)

FIG. 11G

```
SubPlayItem(i) {
    length
    Clip_Iformation_file_name
    Clip_codec_identifier
    reserved_for_future_use
    is_multi_Clip_entries
    ref_to_STC_id
    SubPlayItem_IN_time
    SubPlayItem_OUT_time
    sync_PlayItem_id
    sync_start_PTS_of_PlayItem
    if(is_multi_Clip_entries==1b){
        multi_Clip_entries () {
            number_of_Clip_entries
            reserved_for_future_use
                for(subClip_entry_id=1;
                    subClip_entry_id<number_of_Clip_entries;
                    subClip_entry_id++) {
                    Clip_Iformation_file_name
                    Clip_codec_identifier
                    ref_to_STC_id
                }
            }
        }
    }
}
```

METHOD AND APPARATUS OF REPRODUCING DATA RECORDED ON RECORDING MEDIUM AND LOCAL STORAGE

This application claims the benefit of the Korean Patent Application No. 10-2004-0071367, filed on Sep. 7, 2004, and No. 10-2004-0072147, filed on Sep. 9, 2004, which are hereby incorporated by reference as if fully set forth herein.

This application claims the benefit of U.S. Provisional Application No. 60/601,993, filed on Aug. 17, 2004, in the name of inventors Kang Soo SEO, Jae Yong Yoo, Byung Jin KIM, and Seung Hoon LEE, entitled "METHOD OF CONFIGURING MANAGEMENT FILE IN BLU-RAY DISC", which is hereby incorporated by reference as if fully set forth herein.

BACKGROUND OF THE INVENTION

1. Field of the Invention

The present invention relates to a recording medium, and more particularly, to a method and apparatus of reproducing data recorded on a recording medium and a local storage.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, global standard technical specifications for the blu-ray disc (BD), which is known to be the next generation recording medium technology, are under development as a next generation optical recording solution that is capable of having data significantly surpassing the conventional DVD, along with many other digital apparatuses. Accordingly, an optical recording and reproducing apparatus adopting the Blu-ray disc (BD) standard is also under development. However, since the blu-ray disc (BD) standard is not yet fully completed, there lie many difficulties in developing a complete optical recording and reproducing apparatus.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since a consolidated standard for achieving the above-described additional functions is not yet provided in the current blu-ray disc (BD) standard, there lie many difficulties in developing a full-scale blu-ray disc (BD)-based optical recording and reproducing apparatus. More specifically, a problem may occur in seeking to reproduce both the data existing outside of the recording medium and the data recorded within the recording medium (e.g., blu-ray disc) as a single reproducing unit.

SUMMARY OF THE INVENTION

Accordingly, the present invention is directed to a method apparatus of reproducing data recorded on a recording medium and a local storage that substantially obviate one or more problems due to limitations and disadvantages of the related art.

An object of the present invention is to provide a method of configuring a reproduction management file for reproducing both data recorded within the high density recording medium and data stored in a local storage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reproducing data recorded on a recording medium includes reproducing main data recorded on the recording medium and sub data stored in a local storage using a PlayList file which includes a main path and a sub path, the main path containing a PlayItem for play-back of the main data, the sub path containing at least one SubPlayItem associated with the PlayItem for play-back of the sub data in association with the play-back of the main data, wherein the PlayList file further includes sub path type information which indicates whether the at least one SubPlayItem included in the sub path is synchronized with the PlayItem.

In another aspect of the present invention, a method of reproducing data recorded on a recording medium includes reproducing main data recorded on the recording medium and sub data stored in a local storage using a PlayList file which includes a main path and a sub path, the main path containing a plurality of PlayItems for play-back of the main data, the sub path containing at least one SubPlayItem associated with the PlayItems for play-back of the sub data in association with the play-back of the main data, wherein the PlayList file further includes sub path type information which indicates whether the at least one SubPlayItem included in the sub path is synchronized with the PlayItems.

In another aspect of the present invention, a method of reproducing data recorded on a recording medium includes reproducing AV data and original auxiliary data recorded on the recording medium and additional auxiliary data stored in a local storage using a PlayList file which includes a main path, an original sub path, and at least one additional sub path, the main path containing a plurality of PlayItems for play-back of the AV data, the original sub path containing a SubPlayItem associated with the PlayItems for play-back of the original auxiliary data, each additional sub path containing at least one SubPlayItem associated with the PlayItems for play-back of the additional auxiliary data, wherein the PlayList file further includes sub path type information which indicates whether the at least one SubPlayItem included in each additional sub path is synchronized with the PlayItems.

In another aspect of the present invention, a method of reproducing data recorded on a recording medium includes reproducing AV data and original auxiliary data recorded on the recording medium and additional auxiliary data stored in a local storage using a PlayList file which includes a main path and a sub path, the main path containing a plurality of PlayItems for play-back of the AV data, the sub path containing at least one SubPlayItem associated with the PlayItems for play-back of at least one of the original and additional auxiliary data in association with the play-back of the AV data, wherein the PlayList file further includes sub path type information which indicates whether the at least one. SubPlayItem included in the sub path is synchronized with the PlayItems.

In another aspect of the present invention, an apparatus of reproducing data recorded on a recording medium includes a pick-up unit for reading main data recorded on the recording medium, a local storage for storing sub data associated with the main data, and a decoder for decoding the main data and the sub data using a PlayList file which includes a main path and a sub path, the main path containing a PlayItem for play-back of the main data, the sub path containing at least one SubPlayItem associated with the PlayItem for play-back of the sub data in association with the play-back of the main data, wherein the PlayList file further includes sub path type information which indicates whether the at least one SubPlayItem included in the sub path is synchronized with the PlayItem.

In another aspect of the present invention, an apparatus of reproducing data recorded on a recording medium includes a pick-up unit for reading main data recorded on the recording medium, a local storage for storing sub data associated with the main data, and a decoder for decoding the main data and the sub data using a PlayList file which includes a main path and a sub path, the main path containing a plurality of PlayItems for play-back of the main data, and the sub path containing at least one SubPlayItem associated with the PlayItems for play-back of the sub data in association with the play-back of the main data, wherein the PlayList file further includes sub path type information which indicates whether the at least one SubPlayItem included in the sub path is synchronized with the PlayItems.

In another aspect of the present invention, an apparatus of reproducing data recorded on a recording medium includes a pick-up unit for reading AV data and original auxiliary data recorded on the recording medium, the original auxiliary data being associated with the AV data, a local storage for storing additional auxiliary data associated with the AV data, and a decoder for decoding the AV data and at least one of the original and additional auxiliary data using a PlayList which includes a main path, an original sub path, and at least one additional sub path, the main path containing a plurality of PlayItems for play-back of the AV data, the original sub path containing a SubPlayItem associated with the PlayItems for play-back of the original auxiliary data, each additional sub path containing at least one SubPlayItem associated with PlayItems for play-back of the additional auxiliary data, wherein the PlayList file further includes sub path type information which indicates whether the at least one SubPlayItem included in each additional sub path is synchronized with the PlayItems.

In a further aspect of the present invention, an apparatus of reproducing data recorded on a recording medium includes a pick-up unit for reading AV data and original auxiliary data recorded on the recording medium, the original auxiliary data being associated with the AV data, a local storage for storing additional auxiliary data associated with the AV data, and a decoder for decoding the AV data and at least one of the original and additional auxiliary data using a PlayList file which includes a main path and a sub path, the main path containing a plurality of PlayItems for play-back of the AV data, the sub path containing at least one SubPlayItem associated with the PlayItems for play-back of at least one of the original and additional auxiliary data in association with the play-back of the AV data, wherein the PlayList file further includes sub path type information which indicates whether the at least one SubPlayItem included in the sub path is synchronized with the PlayItems.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and, together with the description serve to explain the principle of the invention. In the drawings:

FIGS. 5A and 5B illustrate a method and apparatus for reproducing data recorded within the recording medium and data stored in a local storage according to the present invention;

FIGS. 10A to 10E illustrate examples of a method of creating (or configuring) a reproduction management file according to the present invention and, most particularly, illustrate examples of a method of creating a PlayList for reproducing text subtitle streams; and FIGS. 11A to 11G illustrate syntaxes of the reproduction management file according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

According to the present invention, a "reproduction management file" refers to a management file for reproducing both data recorded on the recording medium and data stored in a local storage. More specifically, in the blu-ray disc (BD) the reproduction management file is referred to as a "PlayList". A detailed description of the reproduction management file will be made with reference to FIG. 2A and FIG. 2B along with the description of the overall file structure. In other words, although the "PlayList" refers to the reproduction management file in the present invention, it is apparent that a different terminology may be used for a recording medium of a different standard other than the Blu-ray disc (BD). However, it is also apparent that the technical scope of other recording media does not depart from the scope or spirit of the present invention.

Figure 1:
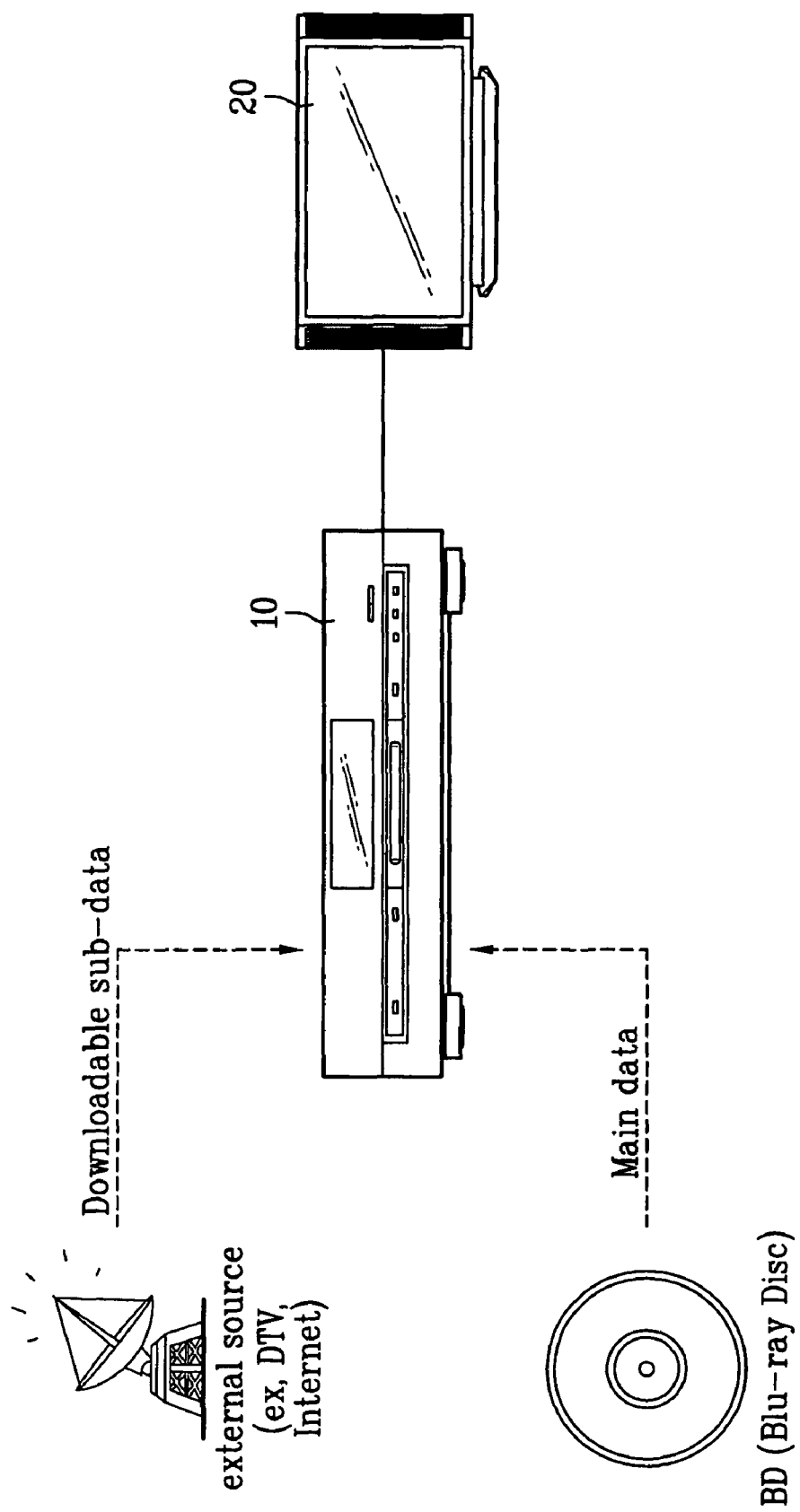
FIG. 1 illustrates a general view of the present invention.

FIG. 1 illustrates a general view of the present invention. More specifically, FIG. 1 illustrates an example of a combined, usage of an optical recording and/or reproducing apparatus 10 and other peripheral apparatuses. Accordingly, the "optical recording and/or reproducing apparatus 10" can record and/or reproduce data on/from optical discs of various standards. Depending upon its design, the apparatus can record/reproduce data on/from an optical disc of a specific standard (e.g., blu-ray disc (BD)) only, or the apparatus can only reproduce data from the optical disc. However, considering the fact that the blu-ray disc (BD) standard is expected to be completed and the association of the blu-ray disc (BD) with other peripheral devices, a Blu-ray disc Player (BD-Player), which reproduces the data recorded on the blu-ray disc (BD), or a Blu-ray disc Recorder (BD-Recorder), which records data on the blu-ray disc (BD), will be given as the example for the optical recording and/or reproducing apparatus 10 according to the present invention. It is also apparent that the "optical recording and/or reproducing apparatus 10" can be referred to as a "driver" which may be equipped in computers.

Apart from the function of recording and/or reproducing the optical disc, the optical recording and/or reproducing apparatus 10 according to the present invention also has the function of receiving an external input signal and processing the received signal and providing the signal to a viewer by transmitting the processed signal onto a screen through a display 20. In this case, there is no limitation for the external signal that can be inputted. Nevertheless, the most common external input signal is a digital broadcast program (DTV) or the Internet. Most particularly, since the Internet is a medium that can be easily accessed by the public, users can make use of specific data provided on the Internet by downloading such data through the optical recording and/or reproducing apparatus 10. The present invention seeks to efficiently reproduce data by combining main data and sub data, when the main data is recorded in the optical disc (i.e., BD), which is loaded in the optical recording and/or reproducing apparatus 10, and when the sub data that is associated with the main data exists in an external source, such as the Internet.

For simplicity of the description of the present invention, the "main data" refers to the signal recorded within the optical disc, and the "sub data" refers to the signal existing in an external source outside of the optical disc. However, the terminologies are only based on the method of acquiring the data, and the main data and the sub data do not limit the data to only specific types of data. Accordingly, the main data generally includes audio data, presentation graphic (PG) data, text subtitle, interactive graphic (IG) data, and so on. And, without being limited to the above-mentioned examples, other types of data existing in an external source, which are associated with the main data, may be used as the sub data. In the present invention, the "interactive graphic (IG)" and the "text subtitle" are given as examples of the sub data that are reproduced.

More specifically, it is assumed that a video/audio stream (AV stream) for a specific film is recorded as the main data on the optical disc. It is also assumed that an "interactive graphic (IG) stream" associated with the AV stream exists on the Internet as the sub data. Then, a user may wish to download the interactive graphic stream, which is the sub data existing on the Internet, and then wish to reproduce the downloaded IG stream along with the AV stream included in the main data. In order to meet with the demands of the user, an association between the AV stream within the optical disc and the downloaded and stored interactive graphic stream needs to be determined, and a systematic method for managing (or controlling) and reproducing such data (i.e., AV stream and IG stream) as desired by the user is also required.

Figure 2:
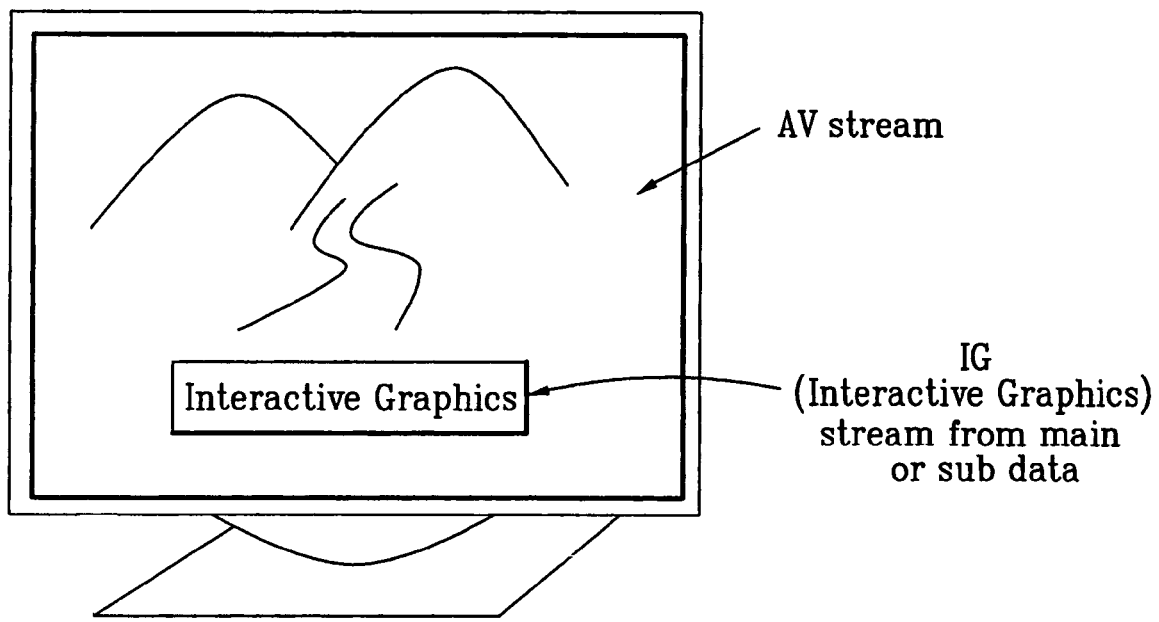
FIG. 2 illustrates an example of an AV stream and an interactive graphic stream according to the present invention being provided on a same display screen.

FIG. 2 illustrates an example of the interactive graphic stream and the AV stream being displayed on the same screen. Generally, the AV stream is displayed on the entire screen. Conversely, the interactive graphic stream is displayed only on a small area (which is also referred to as an "object") within the screen. The interactive graphic stream may either be provided from the main data (e.g., a main interactive graphic stream), which is recorded within the optical disc, or be provided from the sub data (e.g., an auxiliary interactive graphic stream), which is downloaded from an external source.

In order to meet with the demands of the user, a file structure associating the main data and the sub data (most particularly, an auxiliary interactive graphic stream) is required, which will be described in detail with reference to FIGS. 3A to 3C.

Figure 3A:
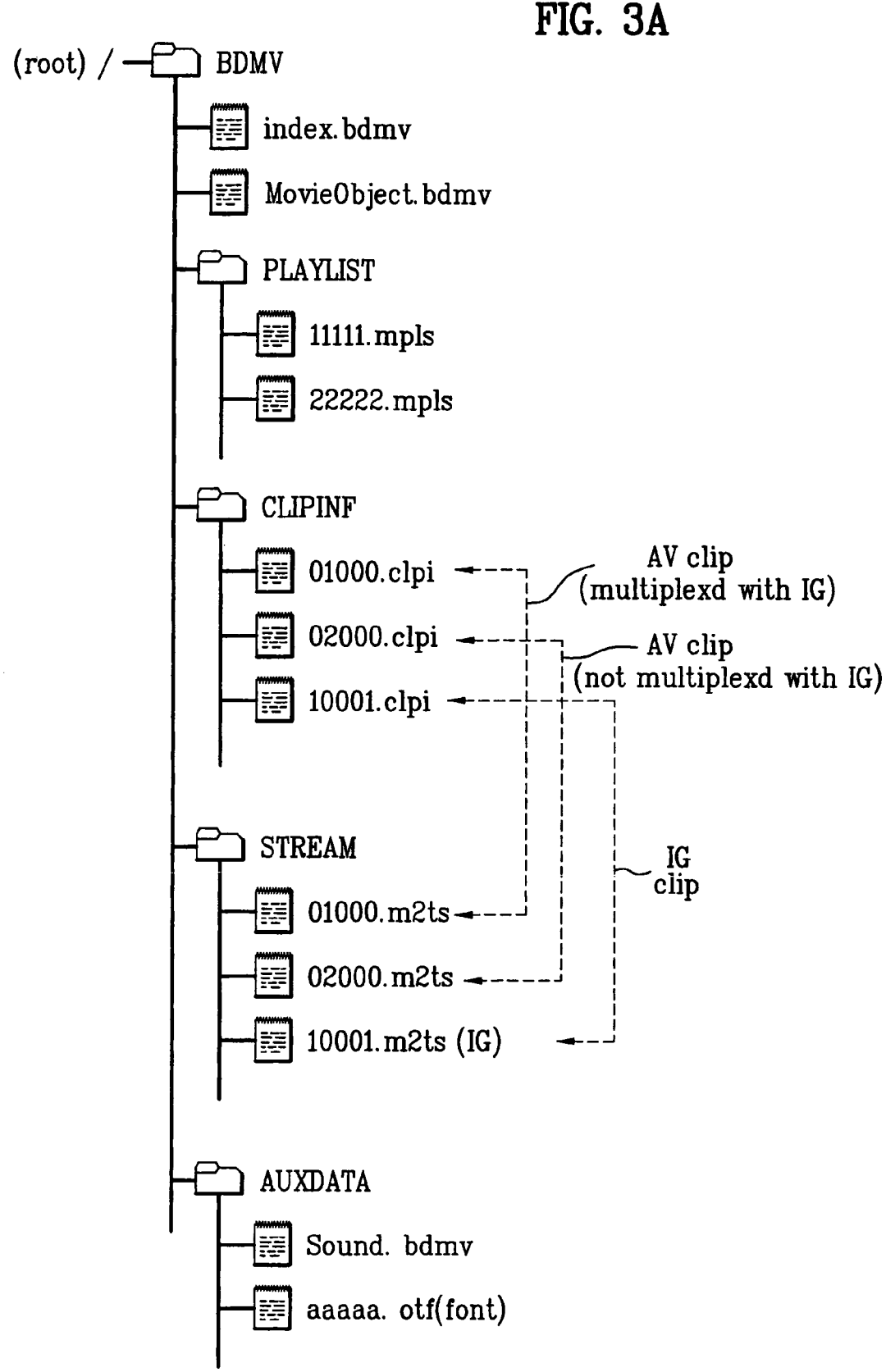
FIGS. 3A and 3B illustrate a file structure and a structure of a PlayList file as a reproduction management file for reproducing the interactive graphic stream according to the present invention.

Referring to FIG. 3A, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. Each BD directory includes four file directories including data to be reproduced, and information required for reproducing the data. The file directories included in each BD directory are an auxiliary data directory (AUXDATA), a stream directory (STREAM), a clip information directory (CLIPINF), and a playlist directory (PLAYLIST).

The auxiliary data directory (AUXDATA) includes additional data files required for the reproduction of the optical disc, such as a "Sound.bdmv" file, a "aaaaa.otf" file, and so on. The "Sound.bdmv" file provides the sound when executing the interactive graphic (IG) stream, and the "aaaaa.otf" file provides font information when reproducing the disc. The stream directory (STREAM) includes AV stream files and interactive graphic stream files. More specifically, each of the streams may generally be in the form of MPEG2 transport packets. In the BD standard, each of the above-described streams is referred to as a clip file. Referring to FIG. 3A, among the stream files, "01000.m2ts" represents an AV stream multiplexed with an interactive graphic stream, "02000.m2ts" represents an independent AV stream that is not multiplexed with any interactive graphic stream, and "10001.m2ts" represents an interactive stream.

Further, the clip information directory (CLIPINF) includes clip information files (e.g., 01000.clpi, 02000.clpi, 10001.clpi) being in one-to-one correspondence with each of the stream files (clip files) included in the stream directory. A clip information file (*.clpi) includes property information and timing information of a stream file (clip file). In the BD standard, each pair of an AV stream (*.m2ts) and its corresponding clip information file (*.clpi), which are in one-to-one correspondence with one another, is designated as a clip. Therefore, each of the "01000.clpi", "02000.clpi", and "10001.clpi" files included in the clip information directory (CLIPINFO) includes the property information and timing information corresponding to each of the "01000.m2ts", "02000.m2ts", and "10001.m2ts" files, respectively, which are included in the stream directory (STREAM). Therefore, each pair of the "01000.clpi" and "01000.m2ts" files, "02000.clpi" and "02000.m2ts" files, and "10001.clpi" and "10001.m2ts" files forms a clip.

More specifically, the clip formed of the "01000.clpi" and "01000.m2ts" pair is referred to as an "AV Clip multiplexed with IG", and the clip formed of the "02000.clpi" and "02000.m2ts" pair is referred to as an "AV Clip not multiplexed with IG". Furthermore, the clip formed of the "10001.clpi" and "10001.m2ts" pair represents a clip formed only of an "interactive graphic stream" without any AV stream. Such clip is referred to as an "IG Clip". Also, in the present invention, a "Main clip" refers to a clip associated with the main data that is recorded on the optical disc, and the "Sub clip" refers to a clip associated with the sub data that is downloaded and stored in a local storage.

Referring back to FIG. 3A, the playlist directory (PLAYLIST) includes one or more PlayList files (*.mpls), wherein each PlayList file (*.mpls) includes at least one PlayItem which designates playing interval for a specific clip. More specifically, a PlayItem includes information designating presentation start and presentation end times (In-Time and Out-Time) for reproduction of a specific clip, which may be designated by clip_Information_File_name within the PlayItem. Accordingly, a PlayList file (*.mpls) represents a reproduction unit (or playback unit) reproducing (or playing-back) a desired clip from a combination of one or more PlayItems. The PlayList also includes a SubPlayItem for reproducing data that is different from the data that is displayed by the PlayItem.

Figure 3B:
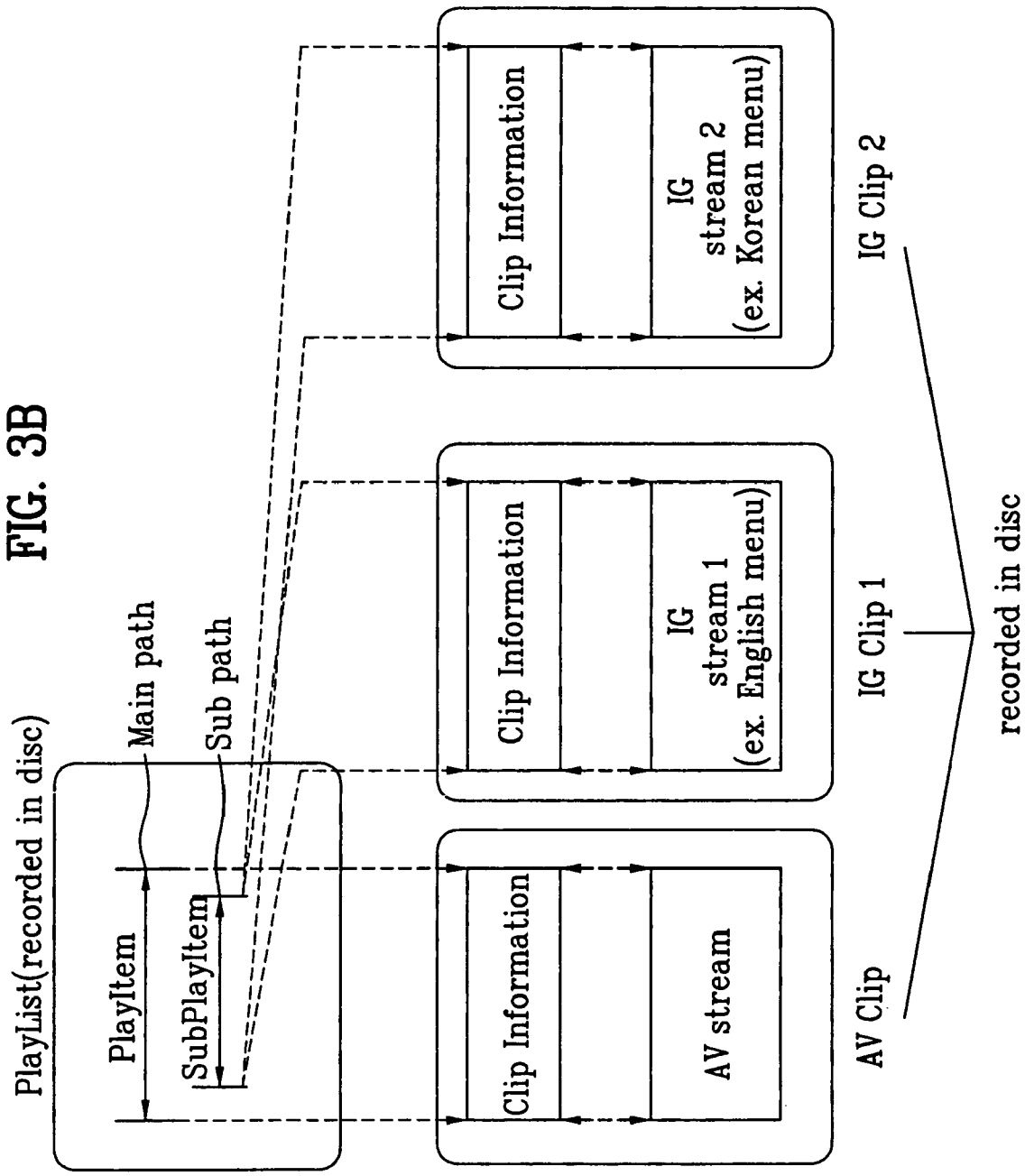

FIG. 3B illustrates a relation (or association) between the PlayList file and the main clip. More specifically, the PlayList file includes a main path having at least one PlayItem, and the PlayItem includes a reproduction management information for reproducing a specific AV clip. In addition, whenever required, the PlayList file includes a sub path including at least one SubPlayItem. Herein, the SubPlayItem includes a reproduction management information for reproducing at least one interactive graphic clip (IG #1, IG #2). For example, the interactive graphic clip #1 (IG #1) may provide a menu information configured in English. And, the interactive graphic clip. #2 (IG #2) may provide a menu information configured in Korean. Therefore, when reproducing (or playing-back) the PlayList of FIG. 3B, the AV stream within the AV clip is reproduced by the PlayItem. Accordingly, the interactive graphic stream corresponding to any one of IG clip #1 and IG clip #2 selected by the SubPlayItem, which is not synchronized with the PlayItem. The AV stream of which reproduction is managed by the PlayItem may either be multiplexed with the interactive graphic or not be multiplexed with the interactive graphic. And, this may be selectively applied by the author of the optical disc.

Figure 3C:
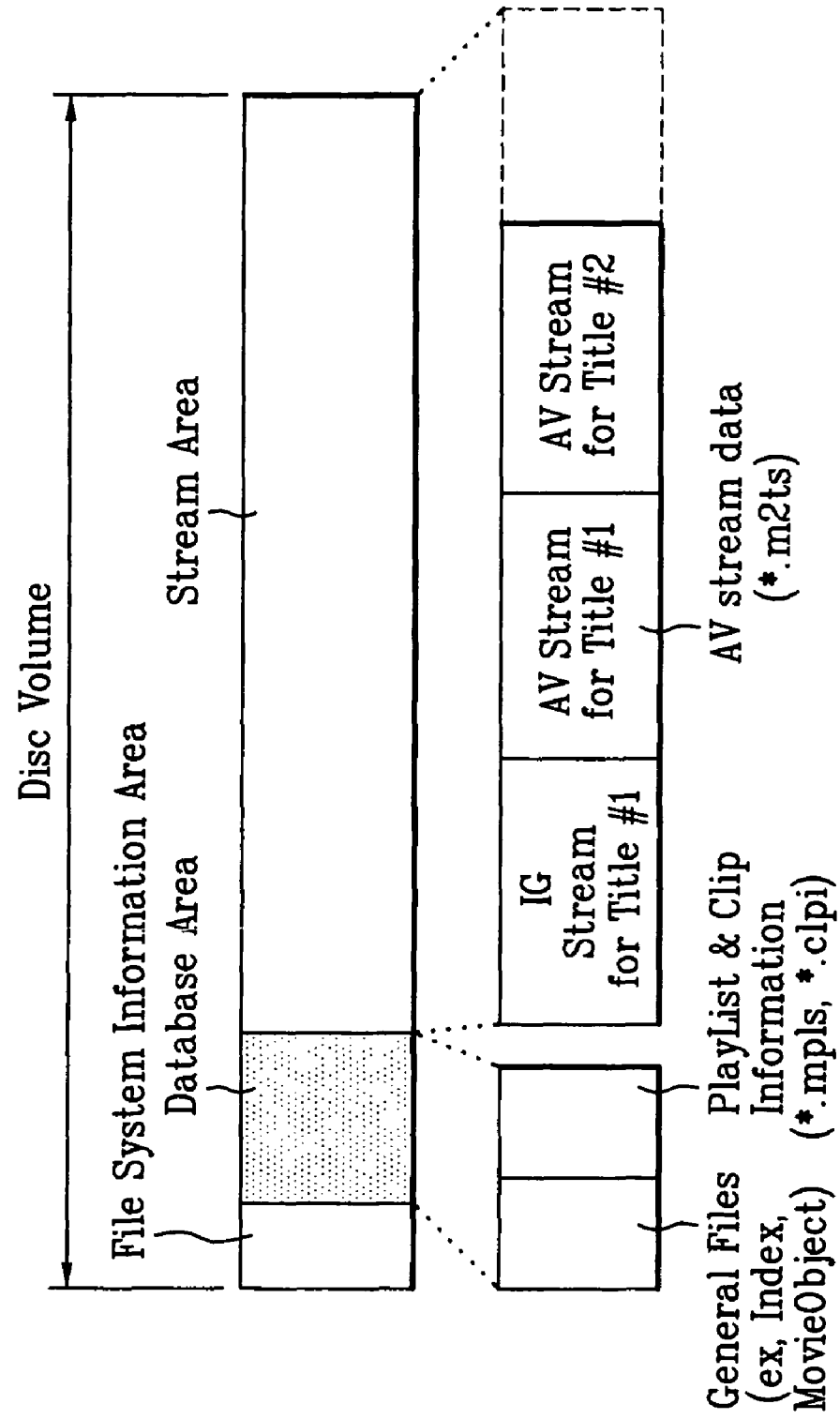
FIG. 3C illustrates a recording structure of data recorded on the recording medium according to the present invention.

FIG. 3C illustrates a general structure of information (or data) associated with the file structure that are recorded on the optical disc according to the present invention. More specifically, starting from the inner circumference (or center) of the disc, the disc volume includes a file system information area occupying the inmost portion of the disc volume, a stream area occupying the outmost portion of the disc volume, and a database area occupied between the file system information area and the stream data area. In the file system information area, system information for controlling the entire data files is recorded. And, main data such as audio/video/graphic data are recorded in the stream area. The general files, PlayList files, and clip information files are recorded in the database area of the disc volume. Therefore, by using the information within the database area, a user is able to select a stream, which the user desires to reproduce, and decide and use the appropriate reproducing method of the selected stream.

Accordingly, if the interactive graphic stream is multiplexed with the AV stream, both streams being recorded in the optical disc, then the two streams are synchronized. However, if the interactive graphic stream recorded in the optical disc is not multiplexed with the AV stream, then the interactive graphic stream and the AV stream are synchronized. Furthermore, since the interactive graphic stream that is stored in the local storage is stored in a location (or position) different from that of the AV stream, which is recorded and stored in the optical disc, it is apparent that the interactive graphic stream is not multiplexed with the AV stream. However, when the user wishes to reproduce the interactive graphic stream that is stored in the local storage along the AV stream, which is recorded in the optical disc, the user should take into account the case when both streams are synchronized and reproduced and, also, the case when both streams are asynchronized and reproduced. The present invention seeks to provide a method of creating a preferred PlayList and a method and apparatus of reproducing data by using the newly created PlayList. Accordingly, the PlayList created according to the present invention is referred to as a "composite PlayList". However, this terminology is used simply to differentiate the newly created PlayList from the already existing PlayList.

Figure 4:
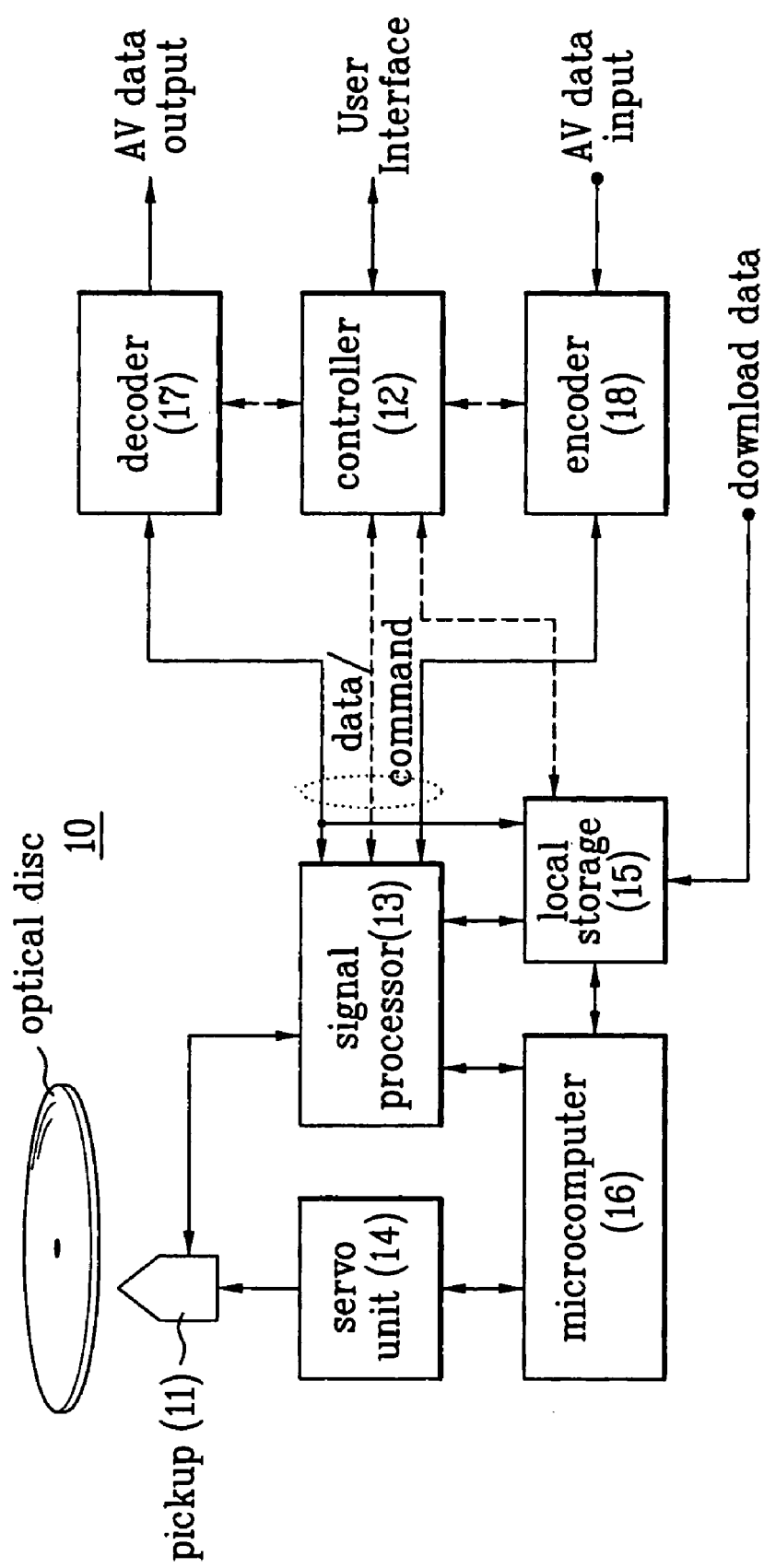
FIG. 4 illustrates an optical recording and/or reproducing apparatus according to the present invention.

FIG. 4 illustrates an optical recording and/or reproducing apparatus 10 according to the present invention. The optical recording and/or reproducing apparatus basically includes a pick-up unit 11 for reproducing the control information including the main data and the file information recorded on the optical disc, a servo 14 controlling the operations of the pick-up unit 11, a signal processor 13 either recovering the playback signal received from the pick-up unit 11 to a desired signal value, or modulating data that is to be recorded to an optical disc recordable signal and transmitting the modulated data, a local storage 15 storing sub data that is downloaded from an external source, and a microcomputer 16 organically controlling the above operations.

In addition, a controller 12 downloads the sub data existing in an external source according to a user command and stores the downloaded sub data in a local storage 15. The controller 12 then creates a composite PlayList for reproducing the main data recorded within the optical disc and the sub data stored in the local storage 15. Thereafter, in accordance with the user command, the controller 12 reproduces the main data and the sub data by using the composite PlayList. A decoder 17 performs a final decoding of an output data (i.e., the main data and/or the sub data) in accordance with the control of the controller 17 and provides the decoded data to the user. Moreover, in order to record a signal within the optical disc, an encoder 18 converts an input signal to a specific format signal (e.g., an MPEG2 transport stream) according to the control of the controller 12 and provides the converted signal to the signal processor 13.

The local storage 15 storing the sub data may also be configured, for example, as a hard disc drive (HDD). And, the newly created composite PlayList may either be stored in the local storage 15 for future usage or be temporarily stored in a separate dynamic memory and used. As an example of the present invention, the optical recording and/or reproducing apparatus separately creates the new composite PlayList. In another example, when downloading the sub data and storing the downloaded sub data, the composite PlayList may also be downloaded and stored. In this case, the optical recording and/or reproducing apparatus 10 is not required to create another separate composite PlayList. Furthermore, if the user desires to store the sub data and the composite PlayList in the local storage 15 for further usage, it is preferable to put more priority in using the PlayList recorded within the optical disc, which manages only the main data.

Figure 5A:
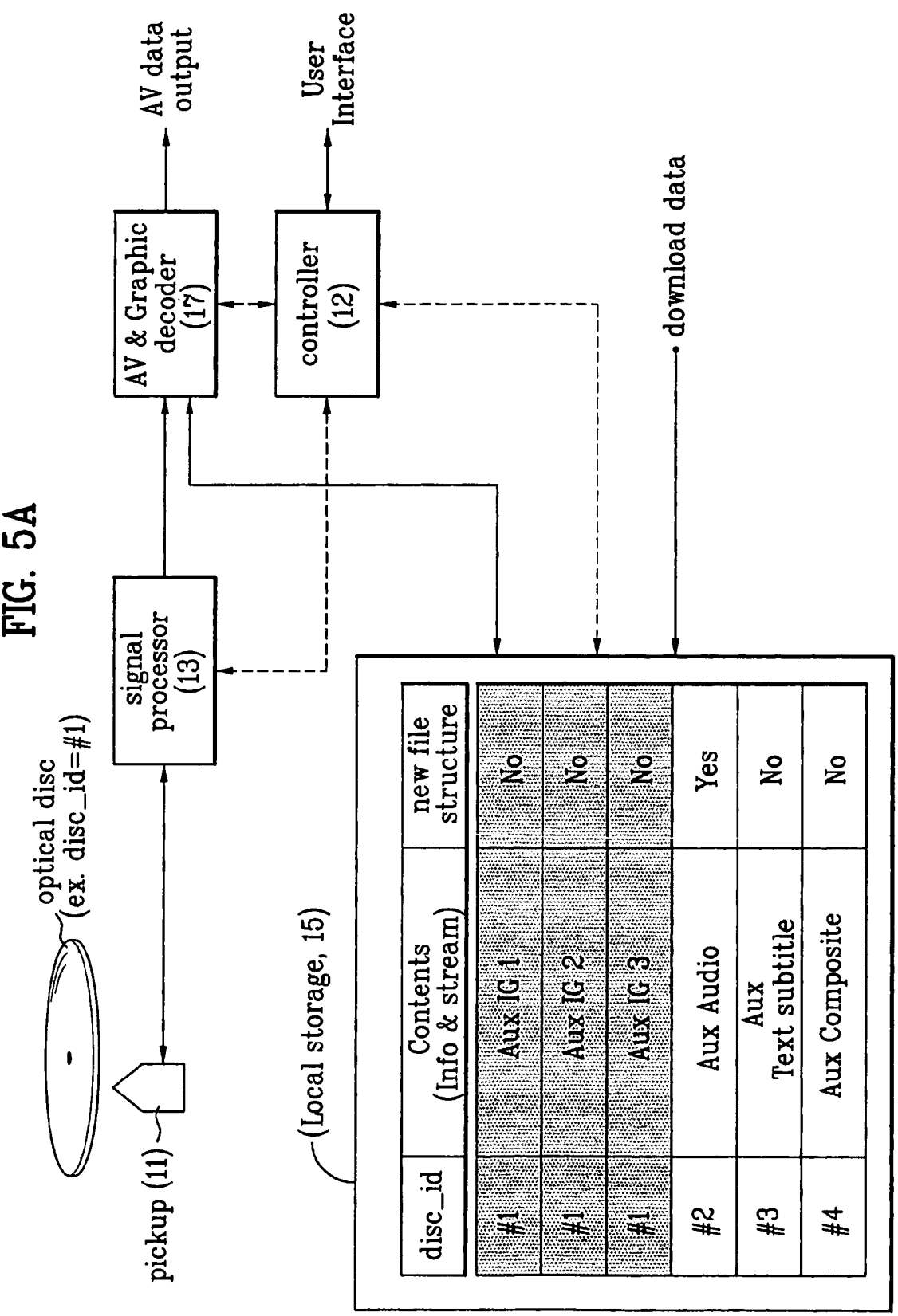

Among the structure of the optical recording and/or reproducing apparatus 10 according to the present invention shown in FIG. 4, FIG. 5A and FIG. 5B illustrate an apparatus for reproducing data and a method for reproducing data, respectively. More specifically, when an optical disc having a disc identification (disc_id) of #1, i.e., disc_id=#1, is loaded, the controller 12 of the optical recording and/or reproducing apparatus 10 verifies the identification of the corresponding disc by using the pick-up unit 11 and the signal processor 13. Then, the controller 12 verifies whether a set of sub data associated with "disc_id=#1" exists among the sub data stored in the local storage 15 (S10).

For example, if three auxiliary interactive streams (Aux IG 1, Aux IG 2, Aux IG 3) exist within the local storage 15 for the "disc_id=#1", the controller 12 first selects a reproduction (or playback) stream in accordance with a user's request or system settings (S20). In other words, the controller 12 may notify the user that the auxiliary interactive graphic stream exists as the sub data, and then the controller 12 may either reproduce only the main data recorded in the disc or select and reproduce the composite PlayList including the auxiliary interactive graphic stream within the local storage 15, in accordance with the user command or system settings. Therefore, when the user wishes to combine and reproduce the main data recorded in the optical disc and the sub data stored in the local storage 15, the controller 12 creates a composite PlayList file and uses the newly created composite PlayList file to reproduce the data (S202).

Accordingly, the newly created composite PlayList file is stored in the local storage 15, which can be used again when reproducing the sub data in a later process. FIG. 5A illustrates an example of a composite PlayList file being already stored in the local storage 15 in order to reproduce an auxiliary audio stream, which is the sub data for "disc_id=#2". Therefore, when the optical disc having the disc ID of "disc_id=#2" is loaded in the optical recording and/or reproducing apparatus 10, the composite PlayList that is already stored in the local storage 15 is used, and reproduction of data can be immediately performed without having to create a new composite PlayList. Furthermore, as described above, the composite PlayList may also be downloaded and used. Hereinafter, various methods of creating a composite PlayList according to the present invention will now be described in detail with reference to FIG. 6A to FIG. 7H.

The characteristics common to all methods of creating the composite PlayList according to the present invention will now be described. The file information for reproducing the main data and the sub data in combination is included in the PlayList file. Herein, the main data is reproduced by at least one PlayItem included in the main path and by a SubPlayItem included in the sub path within the PlayList file. And, the sub data is reproduced only by a SubPlayItem included in the sub path within the PlayList file.

In addition, the interactive graphic stream is given as an example of the sub data that can be applied in FIG. 6A to FIG. 7H. More specifically, the auxiliary interactive graphic stream stored in the local storage may be configured in a language different from that of the main interactive graphic stream recorded within the main data. Alternatively, even if the sub data is configured in the same language as the main stream, the sub data may be configured to have a different attribute. Such attribute may include a graphics characteristic, a menu information represented by the interactive graphic stream, and so on. In other words, the auxiliary interactive graphic stream is used either for replacing the main interactive graphic stream existing within the optical disc or for appending a new interactive graphic stream. Alternatively, when the main interactive graphic stream does not exist within the optical disc, the auxiliary interactive graphic stream may be used for additionally supporting the interactive graphics.

Moreover, when the main interactive graphic stream included in the main data is multiplexed with the AV stream, the main interactive graphic stream is reproduced by a PlayItem. Conversely, when the main interactive graphic stream is not multiplexed with the AV stream, the main interactive graphic stream is identified as a separated IG stream, which is, reproduced by a SubPlayItem. Therefore, in reproducing the auxiliary interactive graphic stream along with the main data (e.g., the AV stream and the main interactive graphic stream), both cases of the auxiliary IG stream being synchronized with the main data and reproduced and the auxiliary IG stream being asynchronized with the main data and reproduced will be explained in the description of the present invention.

Furthermore, the file information used for reproducing the main data and the sub data is linked within the PlayList file. Particularly, the auxiliary interactive graphic stream is configured of a separate sub path within the composite PlayList. Herein, at least one SubPlayItem is created within the sub path in order to manage reproduction of the auxiliary interactive graphic stream. Finally, in order to create a composite PlayList according to the present invention, information associated with the composite PlayList, should be pre-stored within the local storage 15. More specifically, the associated information should be prepared in advance by the author of the optical disc, which is then downloaded from an external source along with the sub data. Referring to FIG. 5A, the "Info" stored within the local storage 15 represents the information required for creating the composite PlayList.

Among the methods for creating the composite PlayList according to the present invention, FIGS. 6A to 6E illustrate examples of creating another sub path for managing reproduction of an "auxiliary interactive graphic stream", when a "main interactive graphic stream" is configured as a separate stream, which is not multiplexed with the AV stream, and when a separate sub path exists so as to reproduce the main interactive graphic stream. In other words, the examples shown in FIGS. 6A to 6E are mostly applied to when the "auxiliary interactive graphic stream" is not synchronized (i.e., asynchronized) with the AV stream included in the main data. Herein, the examples shown in FIGS. 6A to 6E are not limited only to when the auxiliary interactive graphic stream is asynchronized with the AV stream included in the main data. Depending upon the applied usage, these examples may also be adopted in the cases when the auxiliary interactive graphic stream is synchronized with the AV stream included in the main data.

Figure 6A:
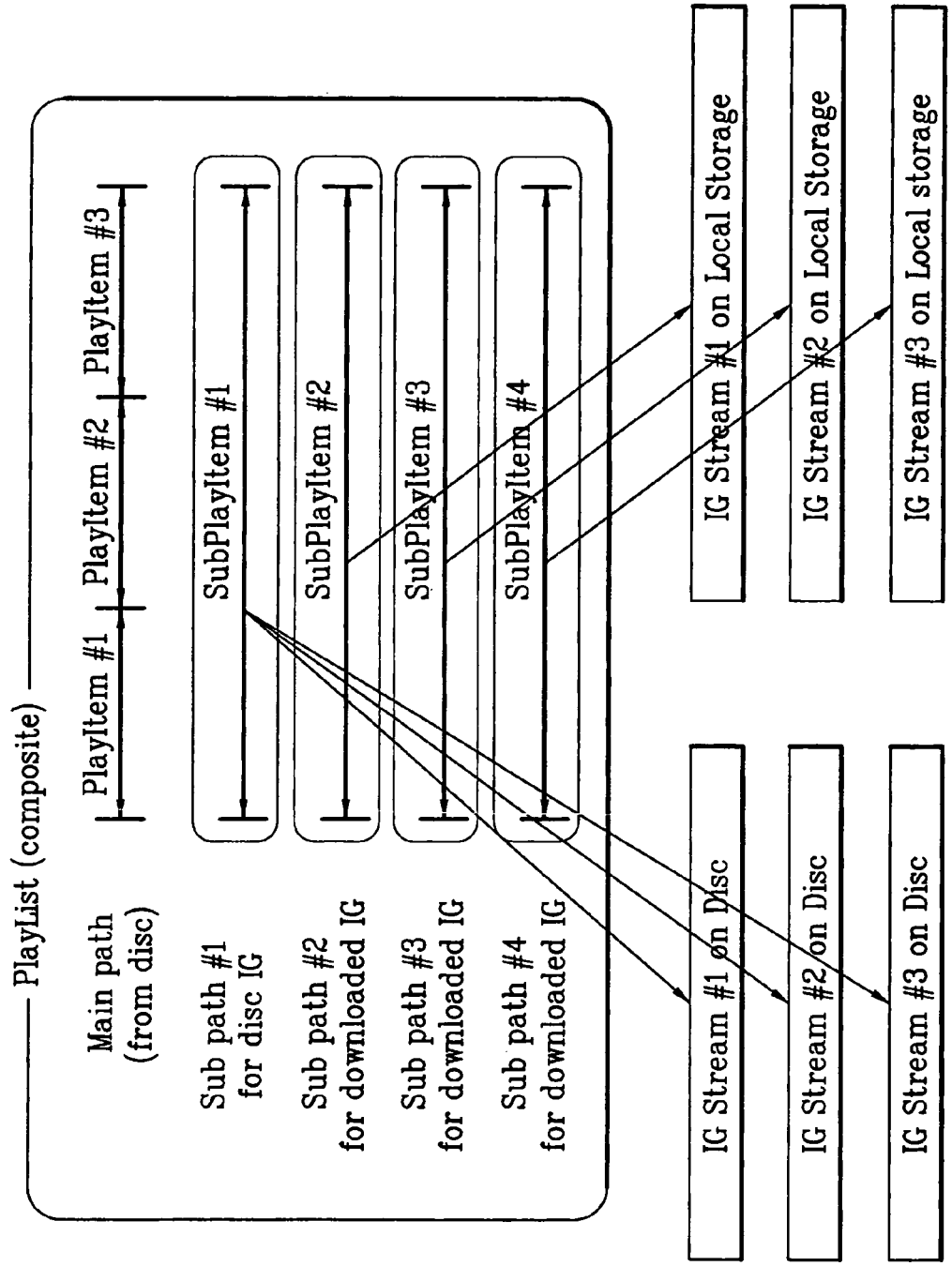
FIGS. 6A to 7H illustrate examples of a method of creating (or configuring) a reproduction management file according to the present invention and, most particularly, illustrate examples of a method of creating a PlayList for reproducing interactive graphic streams.

Referring to FIG. 6A, in creating (or configuring) a sub path for an auxiliary interactive graphic stream, a sub path is created for each of the auxiliary interactive graphic streams. For example, each of sub path #2, sub path #3, and sub path #4 is formed to individually and respectively manage reproduction of auxiliary interactive graphic stream #1, auxiliary interactive graphic stream #2, and auxiliary interactive graphic stream #3, which are stored in the local storage 15. Accordingly, sub path #1 manages reproduction of the main interactive graphic stream recorded in the optical disc. And, the method of managing the main IG stream by using sub path #1 is identical to that described in FIG. 3B.

More specifically, in this example, when three auxiliary interactive graphic streams exist within the local storage, as shown in FIG. 5A, a sub path is created for each of the three auxiliary interactive graphic streams so that each auxiliary IG stream is managed by a corresponding SubPlayItem, thereby creating a structure of "1 stream=1 SubPlayItem=1 sub path". Therefore, when reproducing the above-described composite PlayList, any one of the interactive graphic streams that is designated by sub path #1~sub path #4 may be selectively reproduced along with the main AV data that is included in the optical disc and designated by the main path. In other words, one of the main interactive graphic stream recorded in the disc and the auxiliary interactive graphic stream stored in the local storage 15 may be selectively reproduced. However, depending upon the applied usage, when the auxiliary interactive graphic stream exists, it is possible to put more priority in reproducing any one of the auxiliary interactive graphic streams.

Figure 6B:
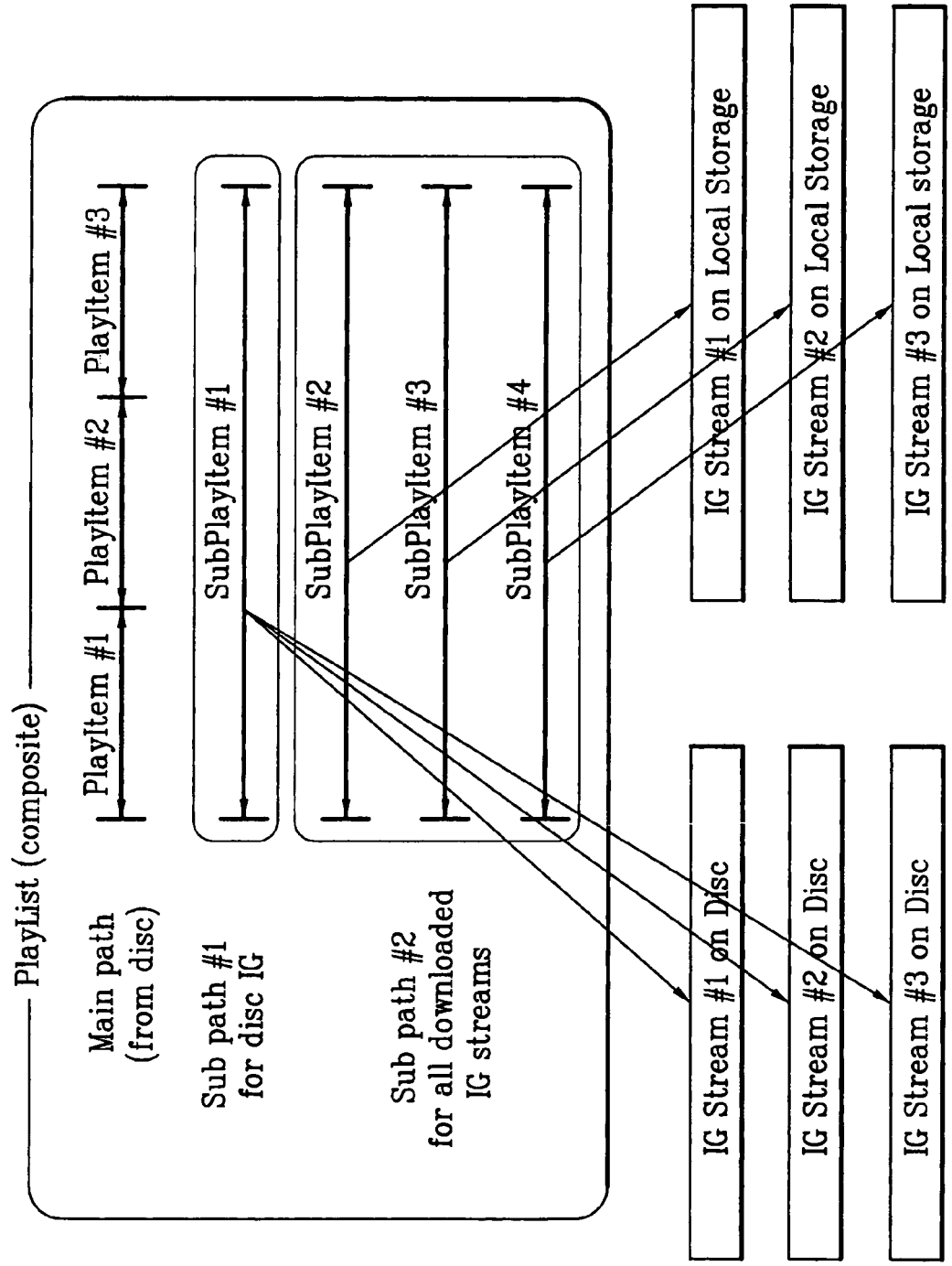

Referring to FIG. 6B, in creating (or configuring) a sub path for an auxiliary interactive graphic stream, a plurality of auxiliary interactive graphic streams is integrated so as to be managed by a single sub path. For example, each of auxiliary interactive graphic stream #1, auxiliary interactive graphic stream #2, and auxiliary interactive graphic stream #3, being stored in the local storage 15, is respectively designated by SubPlayItem #2, SubPlayItem #3, and SubPlayItem #4. Furthermore, SubPlayItem #2, SubPlayItem #3, and SubPlayItem #4 are collectively designated by a single sub path (e.g., sub path #2). Accordingly, sub path #1 manages reproduction of the main interactive graphic stream recorded in the optical disc. And, the method of managing the main IG stream by using sub path #1 is identical to that described in FIG. 3B.

More specifically, in this example, when three auxiliary interactive graphic streams exist within the local storage, as shown in FIG. 5A, each of the auxiliary interactive graphic streams is respectively designated by SubPlayItem #2, SubPlayItem #3, and SubPlayItem #4. Herein, the three SubPlayItems are integrated to create a single sub path (e.g., sub path #2), thereby creating a structure of "1 stream=1 SubPlayItem" which is also a structure of "a plurality of SubPlayItems=1 sub path". Therefore, when reproducing the above-described composite PlayList, any one of sub path #1 and sub path #2 is selected to perform reproduction. Then, any one of the SubPlayItems that is designated by the selected sub path may be selectively reproduced along with along with the main AV data that is included in the optical disc and designated by the main path.

Referring to FIG. 6C, in creating (or configuring) a sub path for an auxiliary interactive graphic stream, a plurality of auxiliary interactive graphic streams is integrated so as to create a single SubPlayItem. For example, auxiliary interactive graphic stream #1, auxiliary interactive graphic stream #2, and auxiliary interactive graphic stream #3, which are stored in the local storage 15, are integrated so as to have the reproduction managed by a single SubPlayItem (e.g., SubPlayItem #2). Herein, SubPlayItem #2 is formed to be included in a single sub path (sub path #2). Accordingly, sub path #1 manages reproduction of the main interactive graphic stream recorded in the optical disc. And, the method of managing the main IG stream by using sub path #1 is identical to that described in FIG. 3B.

More specifically, in this example, when three auxiliary interactive graphic streams exist within the local storage, as shown in FIG. 5A, each of the auxiliary interactive graphic streams is respectively designated by SubPlayItem #2, SubPlayItem #3, and SubPlayItem #4. Herein, the three SubPlayItems are integrated to be designated by a single SubPlayItem (e.g., SubPlayItem #2). Then, the SubPlayItem is included a single sub path (e.g., sub path #2), thereby creating a structure of "a plurality of streams=1 SubPlayItem=1 sub path". Therefore, when reproducing the above-described composite PlayList, any one of sub path #1 and sub path #2 is selected to perform reproduction. Then, any one of the interactive graphic streams that is designated by the selected sub path may be selectively reproduced along with along with the main AV data that is included in the optical disc and designated by the main path.

Figure 6D:
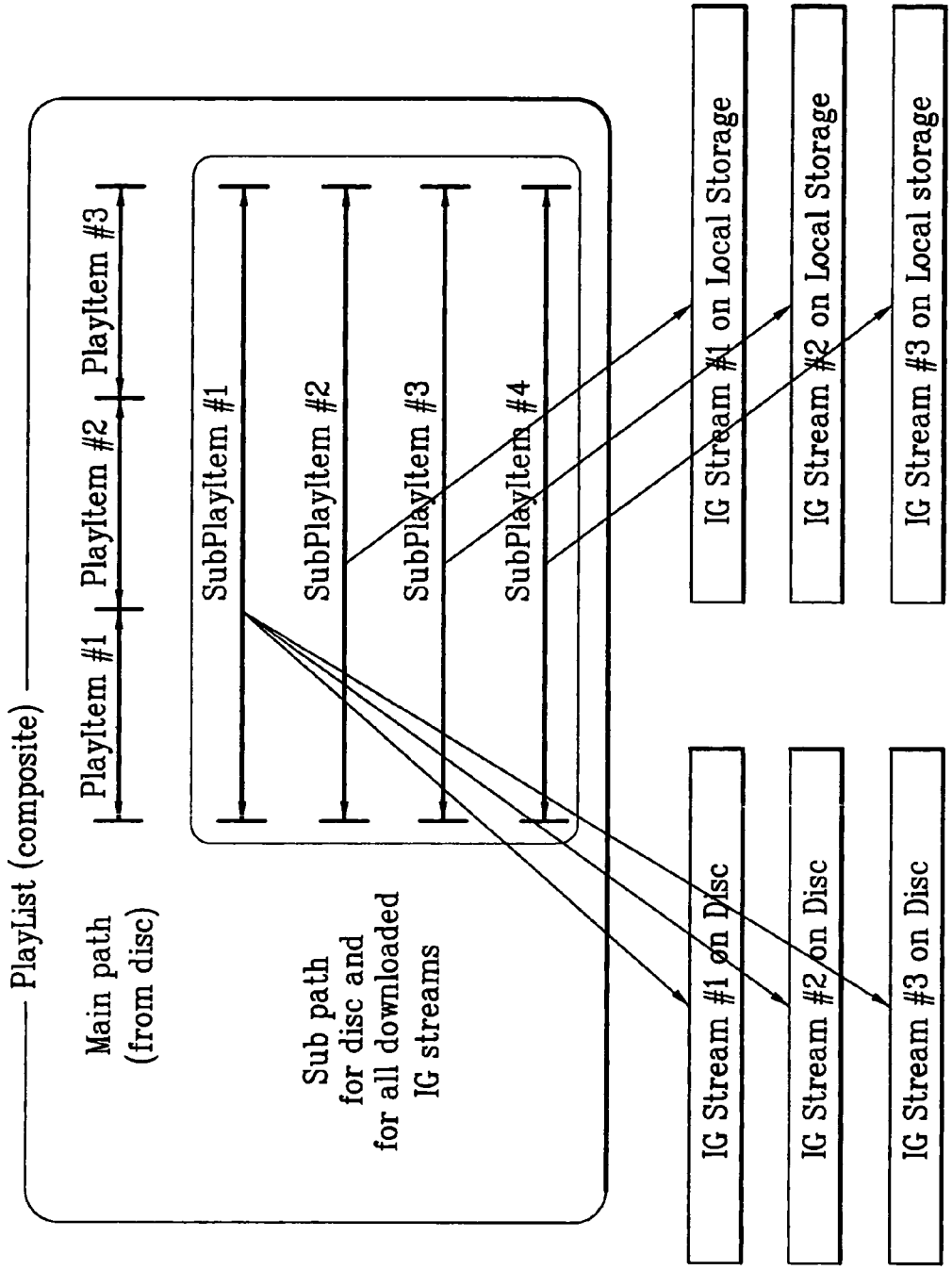
Figure 6E:
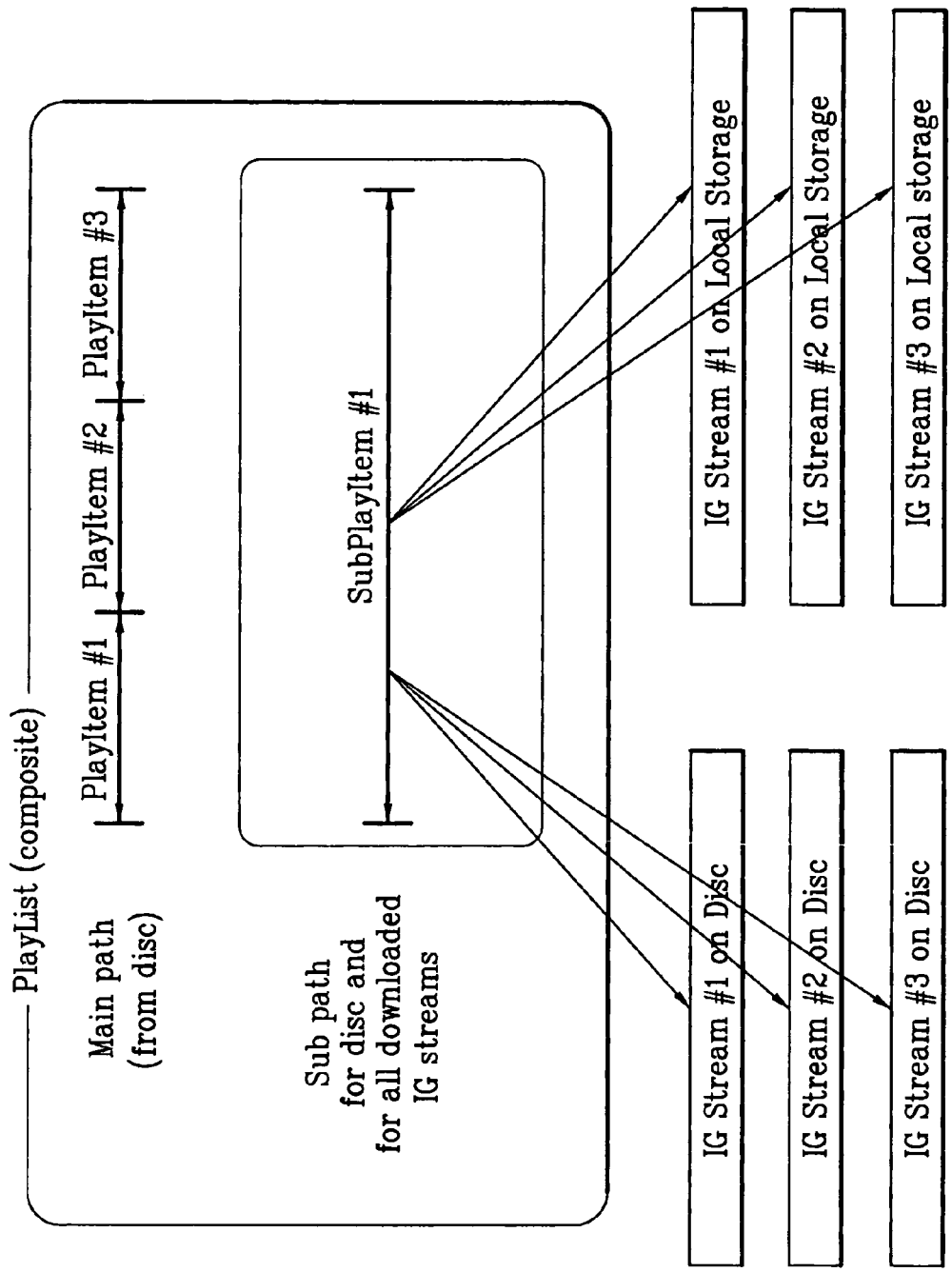

Among the methods for creating the composite PlayList according to the present invention, FIGS. 6D and 6E illustrate examples of integrating a sub path for managing a "main interactive graphic stream" and a sub path for managing an "auxiliary interactive graphic stream" to a single sub path. Referring to FIG. 6D, a plurality of SubPlayItems is configured in a single sub path so as to manage reproduction of main interactive graphic streams and auxiliary interactive graphic streams. More specifically, within the single sub path, SubPlayItem #1 designates a plurality of main interactive graphic streams (main interactive graphic stream #1, main interactive graphic stream #2, main interactive graphic stream #3), thereby managing reproduction of the main interactive graphic streams. Within the same single sub path, a SubPlayItem (SubPlayItem #2, SubPlayItem #3, SubPlayItem #4) is created for each auxiliary interactive graphic stream stored in the local storage 15, thereby managing reproduction of the auxiliary interactive graphic stream. And so, each of SubPlayItem #2, SubPlayItem #3, and SubPlayItem #4 is created to individually designate each of auxiliary interactive graphic stream #1, auxiliary interactive graphic stream #2, and auxiliary interactive graphic stream #3. Herein, the main interactive graphic streams are configured to be designated by SubPlayItem #1. In other words, SubPlayItem #1, SubPlayItem #2, SubPlayItem #3, and SubPlayItem #4 are configured in a single sub path.

Referring to FIG. 6E, a single SubPlayItem is configured in a single sub path so as to manage reproduction of main interactive graphic streams and auxiliary interactive graphic streams. More specifically, a single SubPlayItem (SubPlayItem #1) integrating the main interactive graphic streams and the auxiliary interactive graphic streams for reproduction management is included in a single sub path. Therefore, SubPlayItem #1 integrates all of the plurality of main interactive graphic streams (main interactive graphic stream #1, main interactive graphic stream #2, main interactive graphic stream #3) recorded on the optical disc and the plurality of auxiliary interactive graphic streams (auxiliary interactive graphic stream #1, auxiliary interactive graphic stream #2, auxiliary interactive graphic stream #3) stored in the local storage 15, so as to manage reproduction of the interactive graphic streams, thereby creating a structure of "all main/auxiliary interactive graphic streams=1 SubPlayItem=1 sub path".

Among the methods for creating the composite PlayList according to the present invention, FIGS. 7A to 7H illustrate examples of creating a sub path for managing reproduction of an "auxiliary interactive graphic stream", when a "main interactive graphic stream" is multiplexed with an AV stream, or when the "main interactive graphic stream" is not recorded on the optical disc. In other words, the examples shown in FIGS. 7A to 7H are mostly applied to when the "auxiliary interactive graphic stream" is synchronized with the AV stream included in the main data. Moreover, in order to synchronize the "auxiliary interactive graphic stream" with the AV stream included in the main data, it is apparent that a sync information indicating at which position of the main AV stream the auxiliary interactive graphic stream is synchronized is required. The sync information should be provided from the SubPlayItem included in the sub path which will be described in detail with reference to FIGS. 7A to 7H. Herein, the examples shown in FIGS. 7A to 7H are not limited only to when the auxiliary interactive graphic stream is synchronized with the AV stream included in the main data. Depending upon the applied usage, these examples may also be adopted in the cases when the auxiliary interactive graphic stream is asynchronized with the AV stream included in the main data.

Figure 7A:
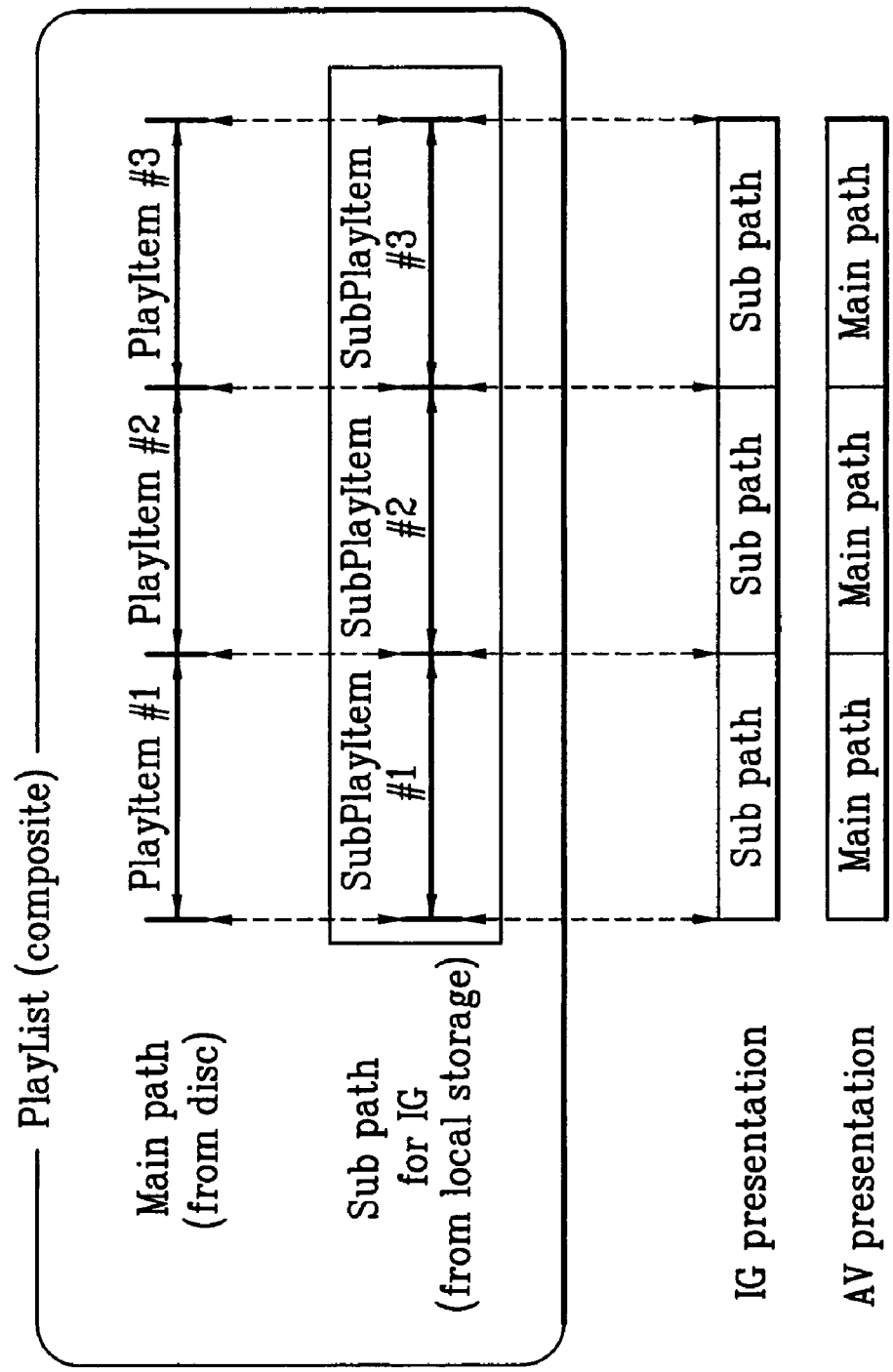

Referring to FIG. 7A, in creating (or configuring) a sub path for an auxiliary interactive graphic stream, a SubPlayItem is created within the sub path, wherein the SubPlayItem matching by one-to-one correspondence with each PlayItem within the main path is created (or configured) individually. More specifically, by designating a SubPlayItem simultaneously corresponding to all of the PlayItems within the PlayList, a main interactive graphic stream that is included in a main clip and designated by each PlayItem may be replaced with the auxiliary interactive graphic stream that is included in a sub clip and designated by each of the corresponding SubPlayItems. This simplifies the system and facilitates the management of each PlayItem. Therefore, when reproducing the optical disc using the above-described composite PlayList, the video/audio (A/V) signal is provided by the main A/V stream recorded within the disc, and the main interactive graphic stream is provided by the auxiliary interactive graphic stream that is stored in the local storage 15. In other words, the main interactive graphic stream recorded within the optical disc is replaced with the auxiliary interactive graphic stream stored in the local storage 15.

Figure 7B:
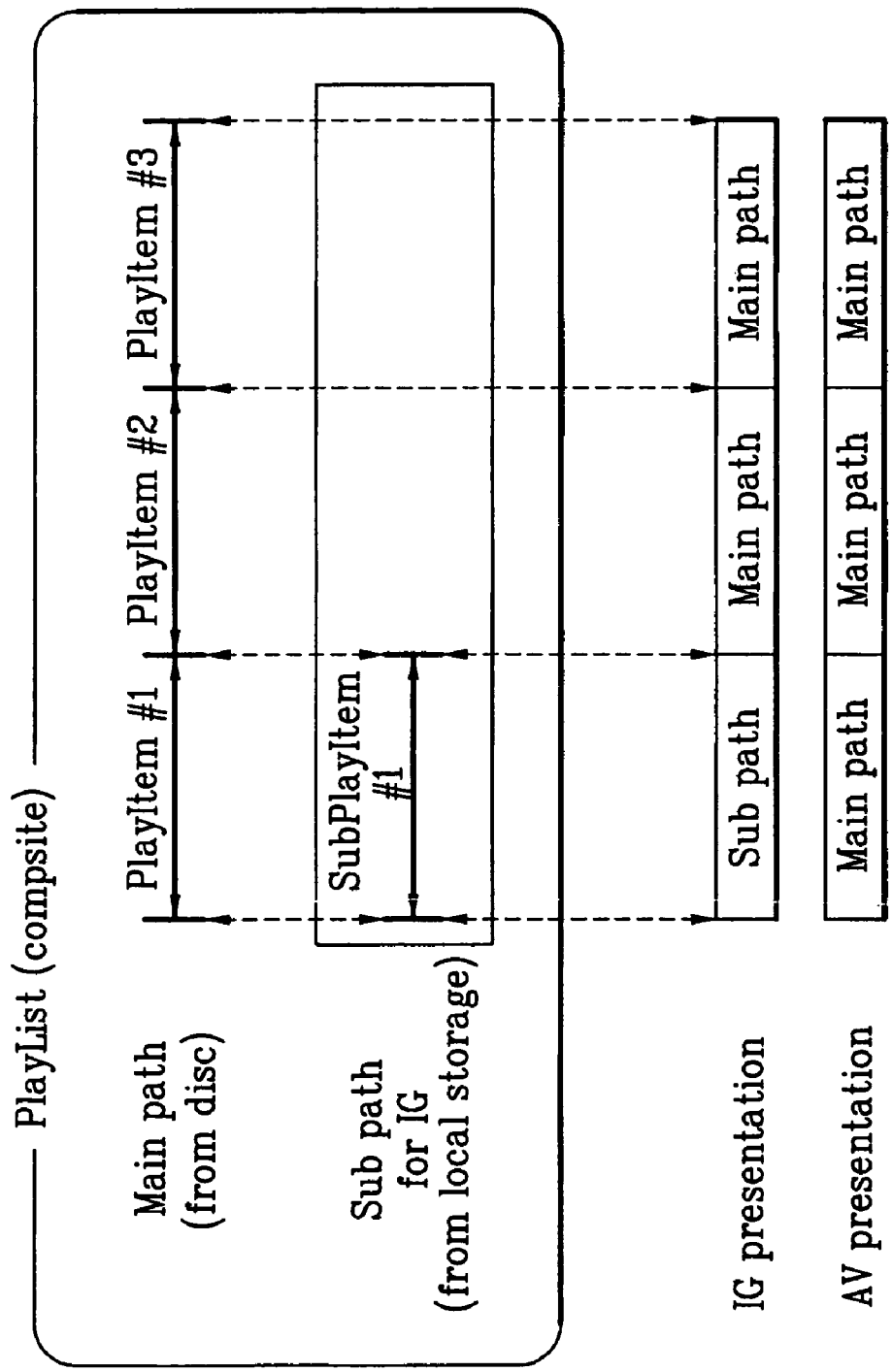

Referring to FIG. 7B, in creating (or configuring) a sub path for an auxiliary interactive graphic stream, a SubPlayItem is created within the sub path, wherein the SubPlayItem matching by one-to-one correspondence with each PlayItem within the main path is created (or configured) individually. However, a matching SubPlayItem may not exist for all of the PlayItems. In other words, by designating a SubPlayItem corresponding to a specific PlayItem within the PlayList, only the main interactive graphic stream that is included in the main clip and designated by the specific PlayItem may be replaced with the auxiliary interactive graphic stream that is included in the sub clip and designated by the corresponding SubPlayItem.

Therefore, when reproducing the optical disc using the above-described composite PlayList, the interactive graphic stream is provided by the auxiliary interactive graphic stream stored in the local storage 15. However, when the SubPlayItem does not exist, the interactive graphic stream is provided by the main interactive graphic stream that is included in the main clip and designated by the corresponding PlayItem. The video/audio (A/V) signal is provided by the main AV stream, which is recorded on the optical disc.

Figure 7C:
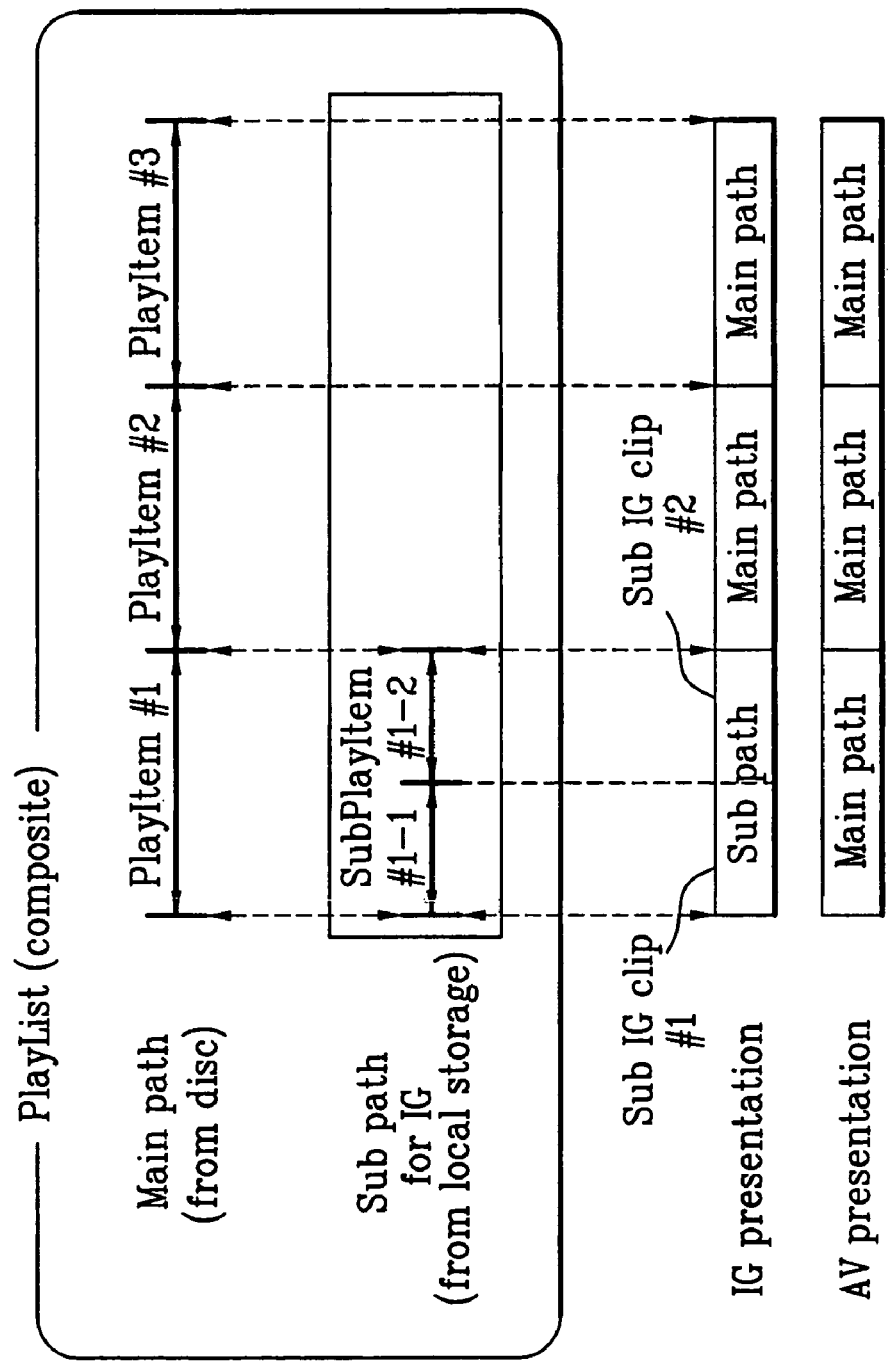

Referring to FIG. 7C, in creating (or configuring) a SubPlayItem within a sub path for an auxiliary interactive graphic stream, the SubPlayItem matching by one-to-one correspondence with each PlayItem within the main path is created (or configured) individually. However, a plurality of matching SubPlayItems may exist for a single PlayItem. In other words, in FIG. 7A and FIG. 7B, one matching SubPlayItem exists for each PlayItem. Conversely, in FIG. 7C, a plurality of matching SubPlayItems exists for one PlayItem. Herein, FIG. 7C only illustrates an example for a single PlayItem (PlayItem #1). However, it is apparent, that this aspect of the present invention can be identically applied to other PlayItems (PlayItem #2, PlayItem #3) as well.

More specifically, by designating a plurality of SubPlayItems corresponding to the specific PlayItem within the PlayList, the main interactive graphic stream that is included in the main clip and designated by PlayItem may be replaced with the auxiliary interactive graphic stream that is included in the plurality of sub clips and designated by the corresponding plurality of SubPlayItems. For example, a main interactive graphic stream that is reproduced by PlayItem #1 may be reproduced by being replaced with two auxiliary interactive graphic streams for each section, both streams having a different attribute (e.g., language). Therefore, when reproducing the optical disc using the above-described composite PlayList, the interactive graphic stream provided by an auxiliary interactive graphic stream stored in the local storage 15. However, when the SubPlayItem does not exist, the interactive graphic stream is provided by the main interactive graphic stream that is included in the main clip and designated by the PlayItem. The video/audio (A/V) signal is provided by the main AV stream, which is recorded on the optical disc.

Figure 7D:
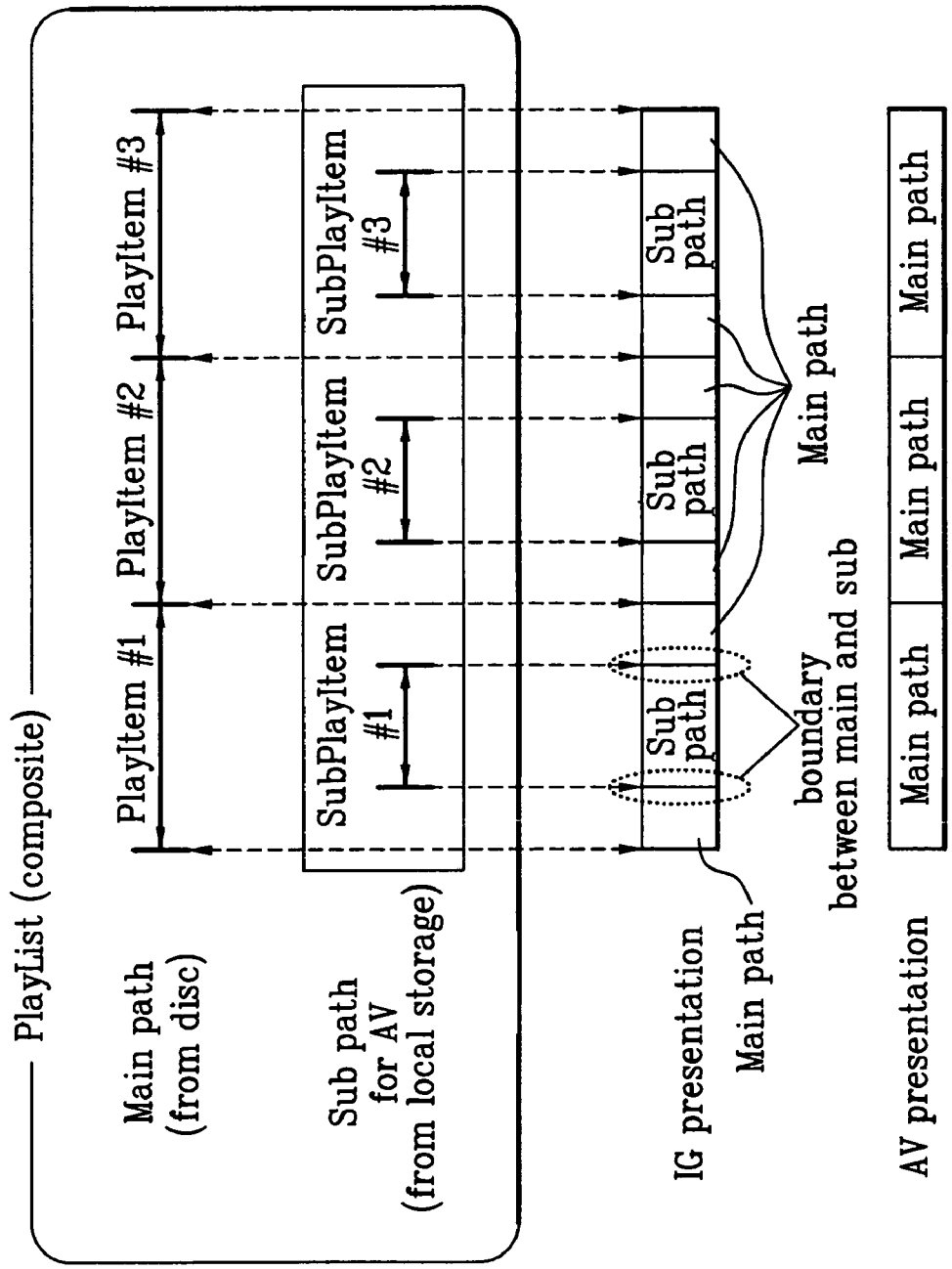

Referring to FIG. 7D, in creating (or configuring) a SubPlayItem within a sub path for an auxiliary interactive graphic stream, the SubPlayItem matching by one-to-one correspondence with each PlayItem within the main path is created (or configured) individually. However, the SubPlayItems that match with a PlayItem may exist only in a partial section among the entire reproduction (or presentation) section that is reproduced by the PlayItem. More specifically, in FIG. 7A, FIG. 7B, and, FIG. 7C, one or more SubPlayItems matches with one entire PlayItem section. However, in FIG. 7D, the SubPlayItem corresponding to one PlayItem exists only in a partial section. In other words, by designating the SubPlayItem corresponding to a specific PlayItem included a PlayList during only a partial section, each of the main interactive graphic stream, which is included in the main clip and designated by the PlayItem, and the auxiliary interactive graphic stream, which is included in the sub clip and designated by the SubPlayItem, is alternately reproduced during the entire reproduction section that is reproduced by the corresponding PlayItem.

Therefore, since the reproduction section (or presentation section) of the SubPlayItem within the sub path is not required to be identical with the PlayItem within the main path, the SubPlayItem can apply the auxiliary audio stream more diversely. However, in this case, a boundary between the reproduction (or presentation) of the main clip and the reproduction (or presentation) of the sub clip is created. Herein, the main clip is reproduced by a PlayItem (e.g., PlayItem #1), and then, the reproduction of the main clip is changed to the reproduction of the sub clip. At this point, the system needs to be supported so that a seamless presentation can be performed between the interactive graphic streams even at the boundary.

Figure 7E:
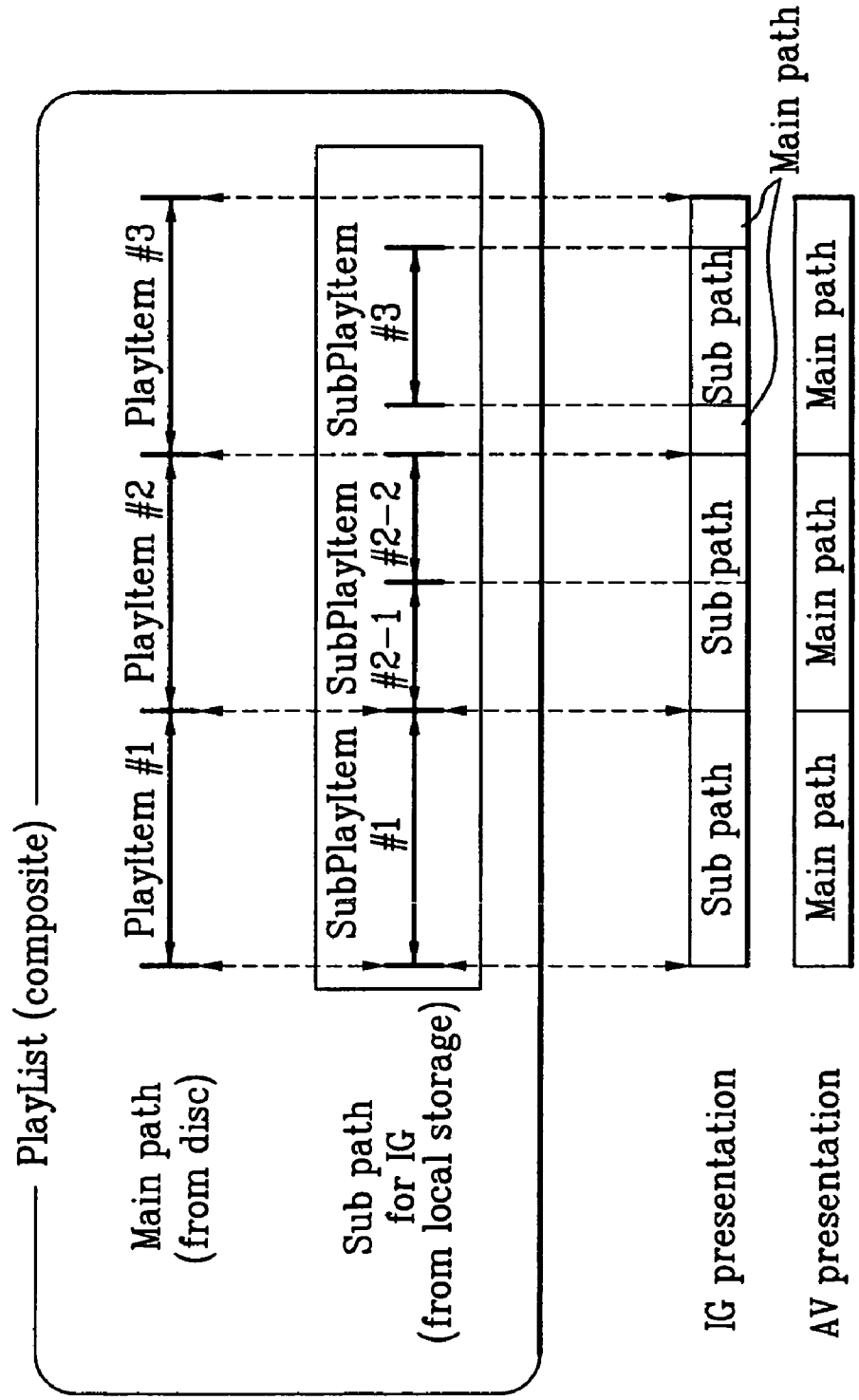

Referring to FIG. 7E, in creating (or configuring) a SubPlayItem within a sub path for an auxiliary interactive graphic stream, the SubPlayItem matching by one-to-one, correspondence with each PlayItem within the main path is created (or configured) individually. However, each of the SubPlayItems is matched with its respective PlayItem by different methods. More specifically, in FIG. 7E, the examples of creating the SubPlayItem as shown in FIGS. 7A to 7D can be applied to each PlayItem. For example, the method of replacing the entire section of PlayItem #1 with a SubPlayItem (as shown in FIG. 7A or FIG. 7B), the method of replacing the entire section of PlayItem #2 with a plurality of SubPlayItems (as shown in FIG. 7C), and the method of replacing only part of the entire section of PlayItem #3 with a SubPlayItem (as shown in FIG. 7D) are all applied in FIG. 7E.

Figure 7F:
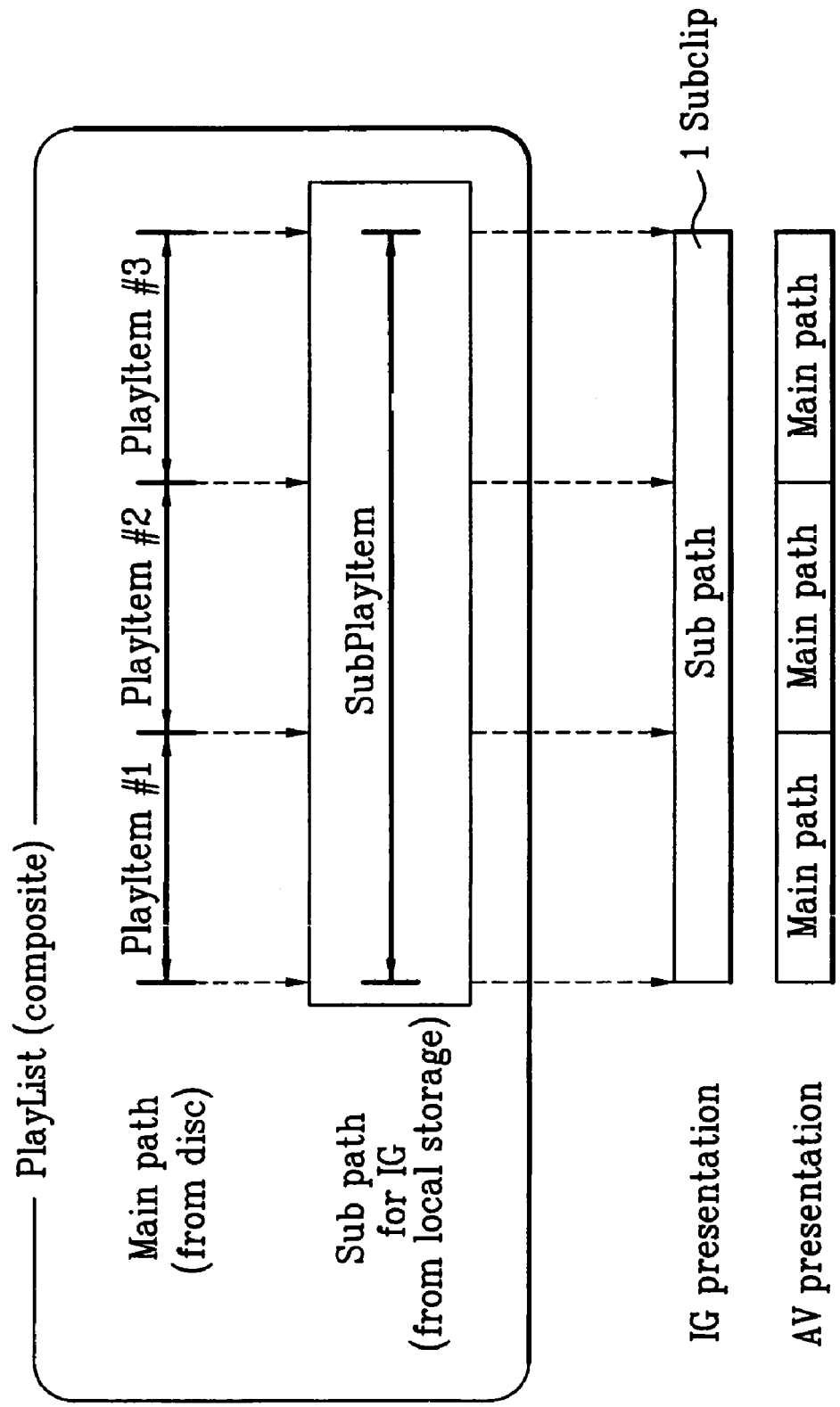

Referring to FIG. 7F, in creating (or configuring) a SubPlayItem within a sub path for an auxiliary interactive graphic stream, a SubPlayItem matching with the entire presentation section of the PlayList is created (or configured) individually. More specifically, by designating a SubPlayItem that simultaneously corresponds to all PlayItems within the PlayList, the main interactive graphic streams included in the main clip and designated by each PlayItem may be replaced with the auxiliary interactive graphic stream included in a single sub clip and designated by a corresponding single SubPlayItem. Thus, the system can be simplified.

Figure 7G:
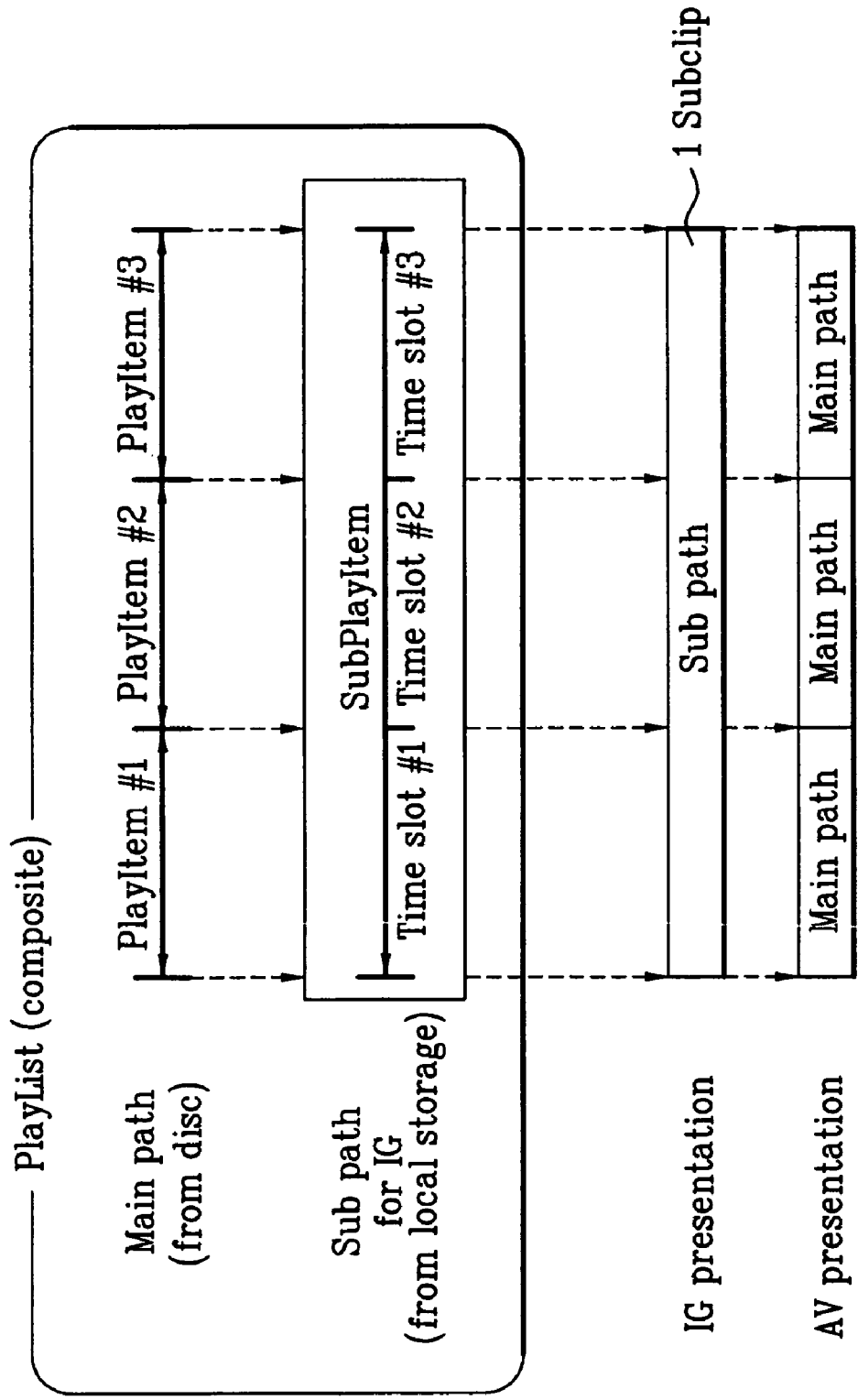

Referring to FIG. 7G, in creating (or configuring) a SubPlayItem within a sub path for an auxiliary interactive graphic stream, a SubPlayItem matching with the entire presentation section of the PlayList is created (or configured) individually. Herein, a presentation section is chronologically defined within the SubPlayItem, which includes information on a presentation start time (In-time) and a presentation end time (Out-time) of a sub clip of which reproduction is managed. In case of FIG. 7F, the SubPlayItem includes an In-time and an Out-time matching with the In-time and the Out-time reproducing (or presenting) the main path included in the PlayList. However, in case of FIG. 7G, a SubPlayItem includes a plurality of In-times and out-times. Accordingly, each section defined as an In-time and an Out-time is referred to as a "time slot". For example, FIG. 7G illustrates three time slots "Time slot #1", "Time slot #2", and "Time slot #3" included in a SubPlayItem. The time slot may be created from a random section. However, the time slot may also be matched with PlayItem #1, PlayItem #2, and PlayItem #3 within the main path.

Figure 7H:
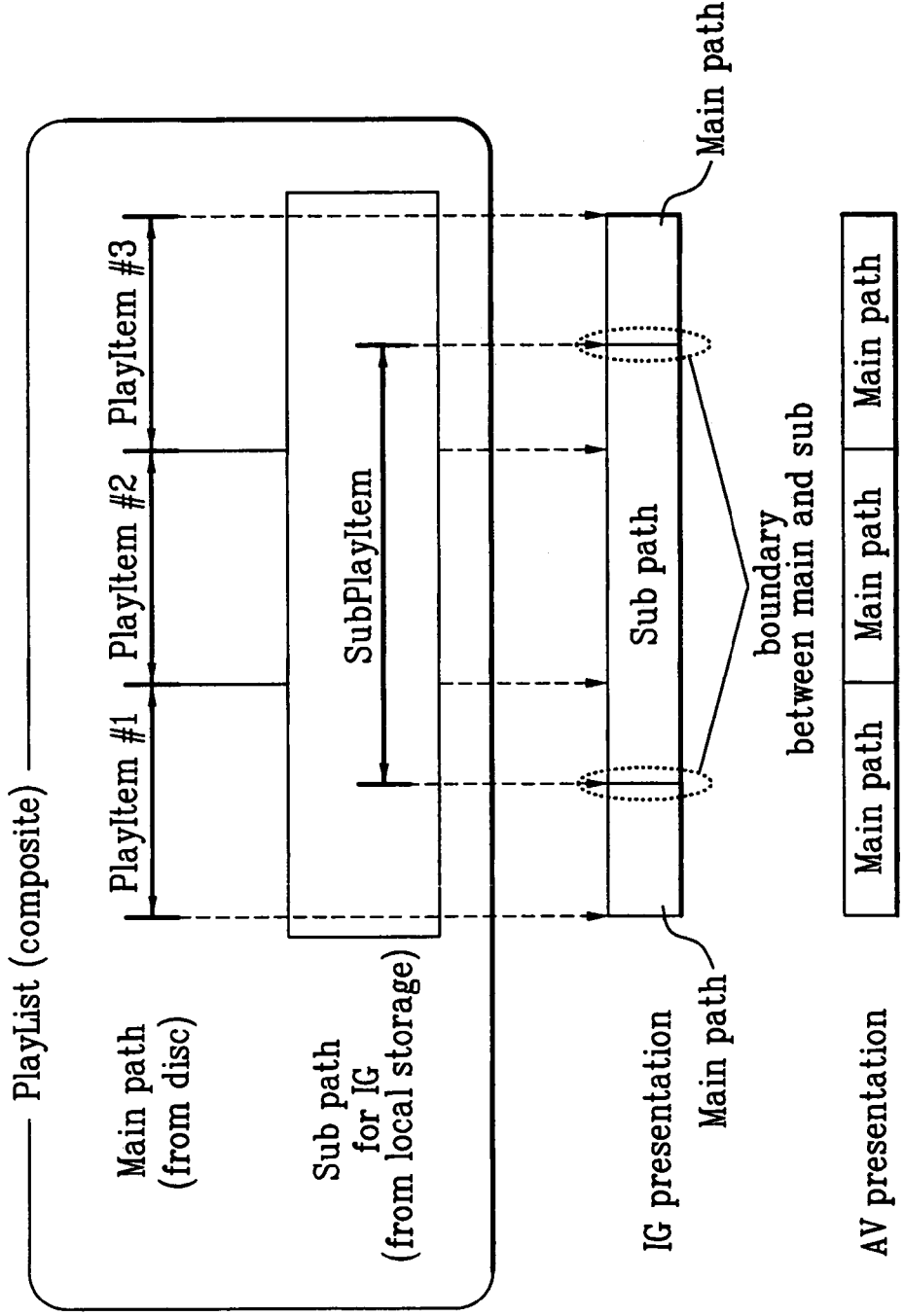

Referring to FIG. 7H, in creating (or configuring) a SubPlayItem within a sub path for an auxiliary interactive graphic stream, a SubPlayItem matching with only a partial section of the entire PlayList section is created (or configured) individually. More specifically, in case of FIG. 7F, a single SubPlayItem having an In-time and an Out-time matching with the entire section of the PlayItem (i.e., the presentation (or playback) section of the PlayList) is created. However, in FIG. 7H, a SubPlayItem having an In-time and an Out-time corresponding to a partial section within the entire section of the PlayItem (i.e., the presentation (or playback) section of the PlayList) is created. Accordingly, it is apparent that the concept of the "Time slot", which is applied in FIG. 7G, may also be applied identically in FIG. 7H.

In other words, part of the entire main data presentation section reproduced (or presented) by the PlayList is replaced with the sub data. For example, part of the entire section that is reproduced by the composite PlayList reproduces the main interactive graphic stream, and another part of the entire section reproduces the auxiliary interactive graphic stream. Therefore, since the reproduction section (or presentation section) of the SubPlayItem within the sub path is not required to be identical with the PlayItem within the main path, the SubPlayItem can apply the auxiliary interactive graphic stream more diversely. However, in this case, a boundary between the reproduction (or presentation) of the main clip and the reproduction (or presentation) of the sub clip is created. Herein, the main clip is changed to the reproduction of the sub clip during the reproduction of the main clip. At this point, the system needs to be supported so that a seamless presentation can be performed between the audio streams even at the boundary.

As described above, FIGS. 7A to 7H illustrate examples of creating a single sub path. It is apparent that the methods described in FIGS. 6A to 6C may be used, when creating a plurality of sub paths. More specifically, when the "main interactive graphic" exists as a separated stream that is not multiplexed with the main AV stream, it is preferable to apply any one of the methods described in FIGS. 6A to 6E. Alternatively, when the "main interactive graphic" is multiplexed with the main AV stream, it is preferable to apply any one of the methods described in FIGS. 7A to 7H. On the other hand, when the "auxiliary interactive graphic" is not synchronized with the main AV stream, it is preferable to apply any one of the methods described in FIGS. 6A to 6E. Conversely, when the "auxiliary interactive graphic" is synchronized with the main AV stream, it is preferable to apply any one of the methods described in FIGS. 7A to 7H.

Hereinafter, methods for creating and playing-back (or reproducing) a PlayList for managing reproduction of a text subtitle stream as the sub data along with the main data will now be described in detail with reference to FIG. 8 to FIG. 10E. Accordingly, the text subtitle stream, which is a set of information provided in a text form, is generally used as a superimposed dialogue of movies. Therefore, the text subtitle stream according to the present invention must be provided after being synchronized with the AV stream. This is different from the above-described interactive graphic stream which includes the case when the interactive graphic stream is synchronized with the AV stream and the case when the interactive graphic stream is not synchronized (i.e., asynchronized) with the AV stream. Furthermore, the text subtitle stream according to the present invention corresponds to the entire presentation section of the PlayList. In other words, a text subtitle stream is not provided for each PlayItem, and the reproduction of the text subtitle stream is managed by a SubPlayItem which is synchronized with the main path. This is different from the examples of creating a SubPlayItem for each PlayItem when the interactive graphic stream is synchronized with the AV stream (shown in FIGS. 7A to 7E).

Figure 8:
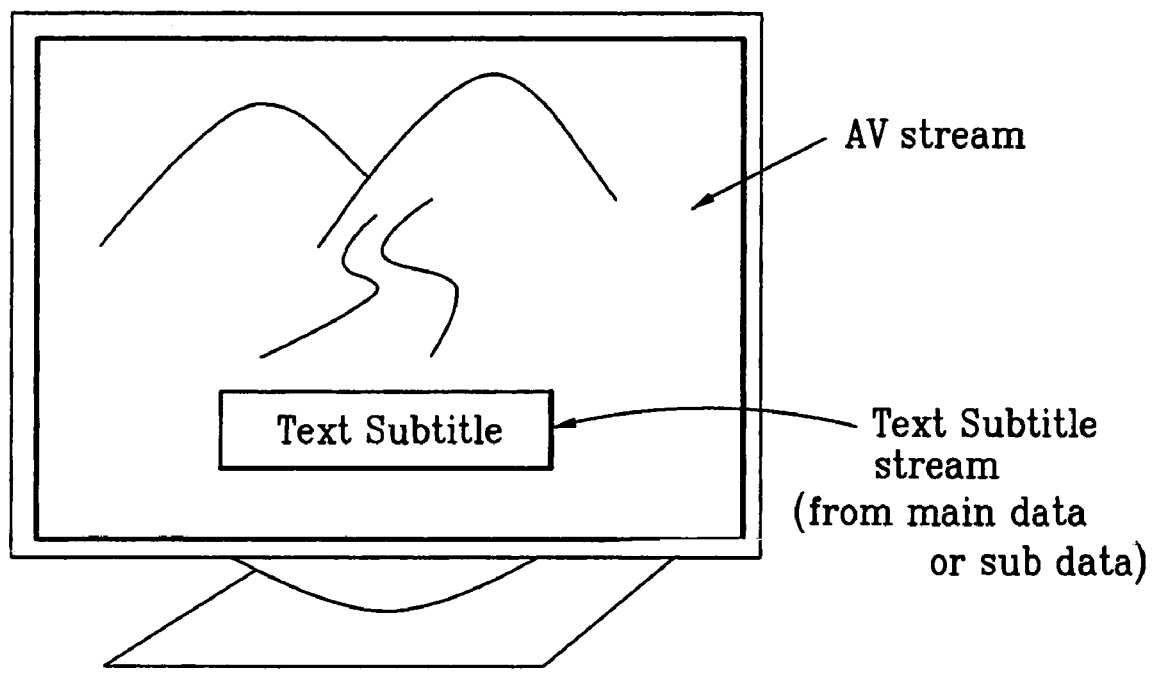
FIG. 8 illustrates an example of an AV stream and a text subtitle stream according to the present invention being provided on a same display screen.
Figure 9A:
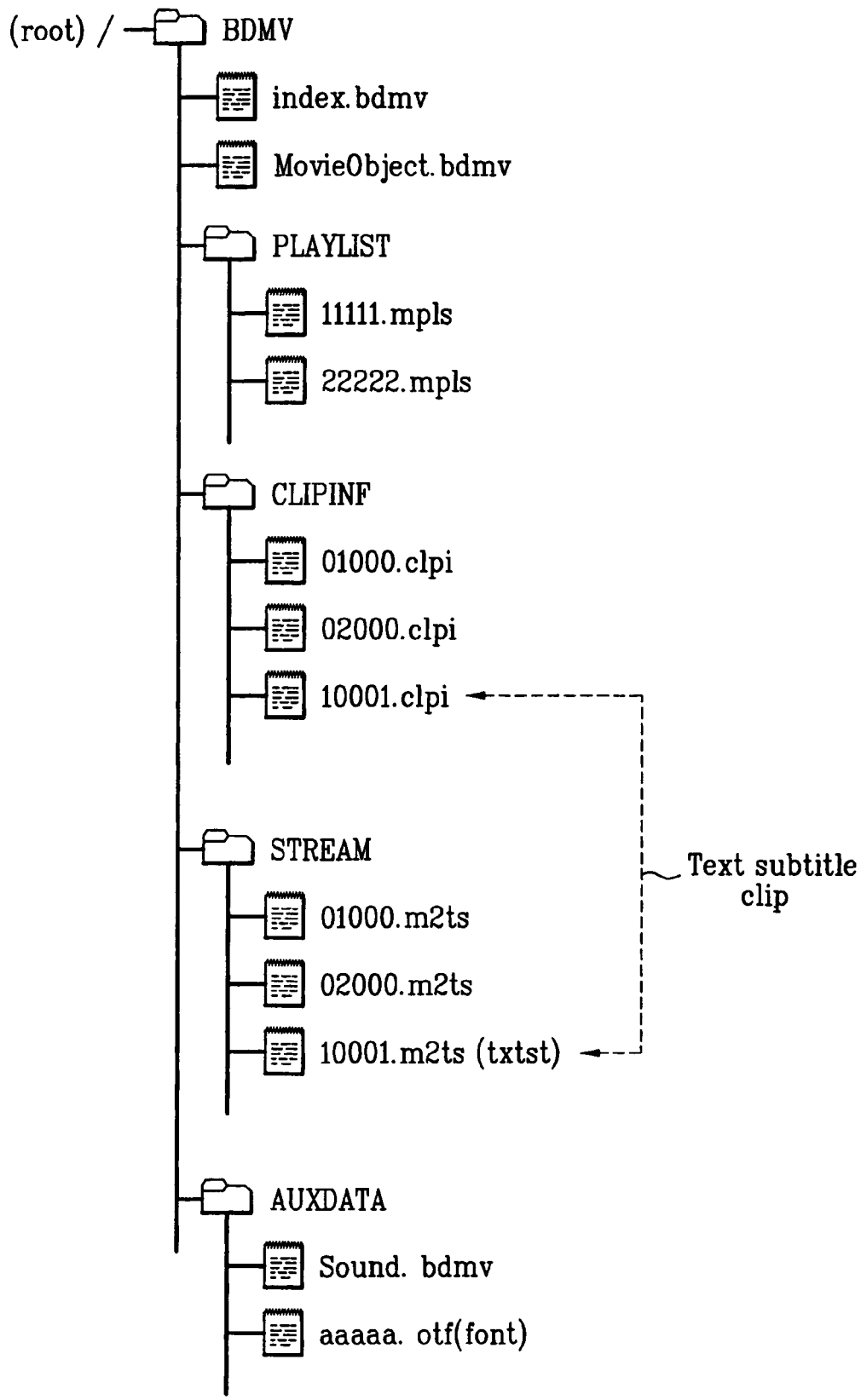
FIGS. 9A and 9B illustrate a file structure and a structure of a PlayList file as a reproduction management file for reproducing the text subtitle stream according to the present invention.
Figure 9B:
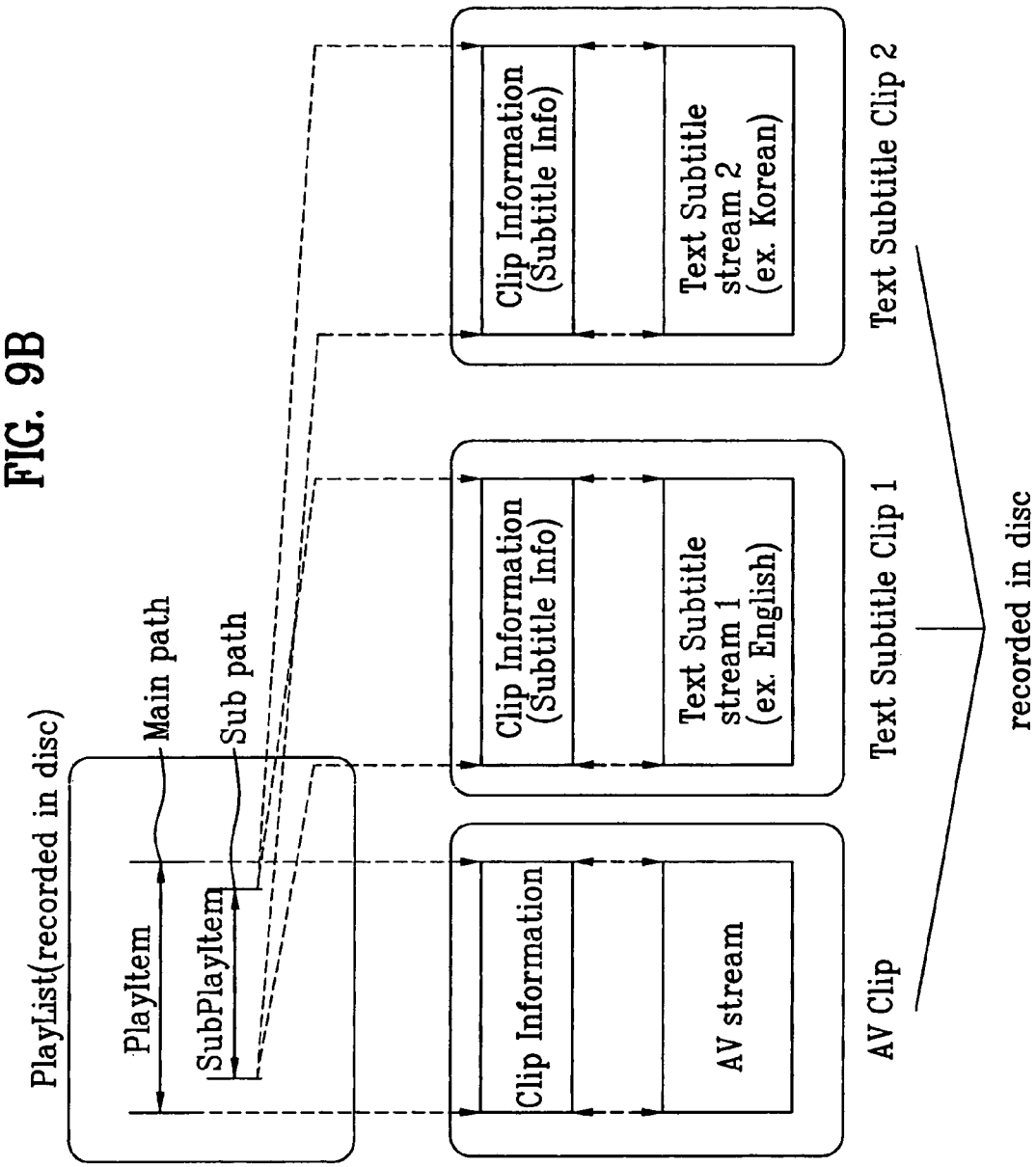
Figure 10A:
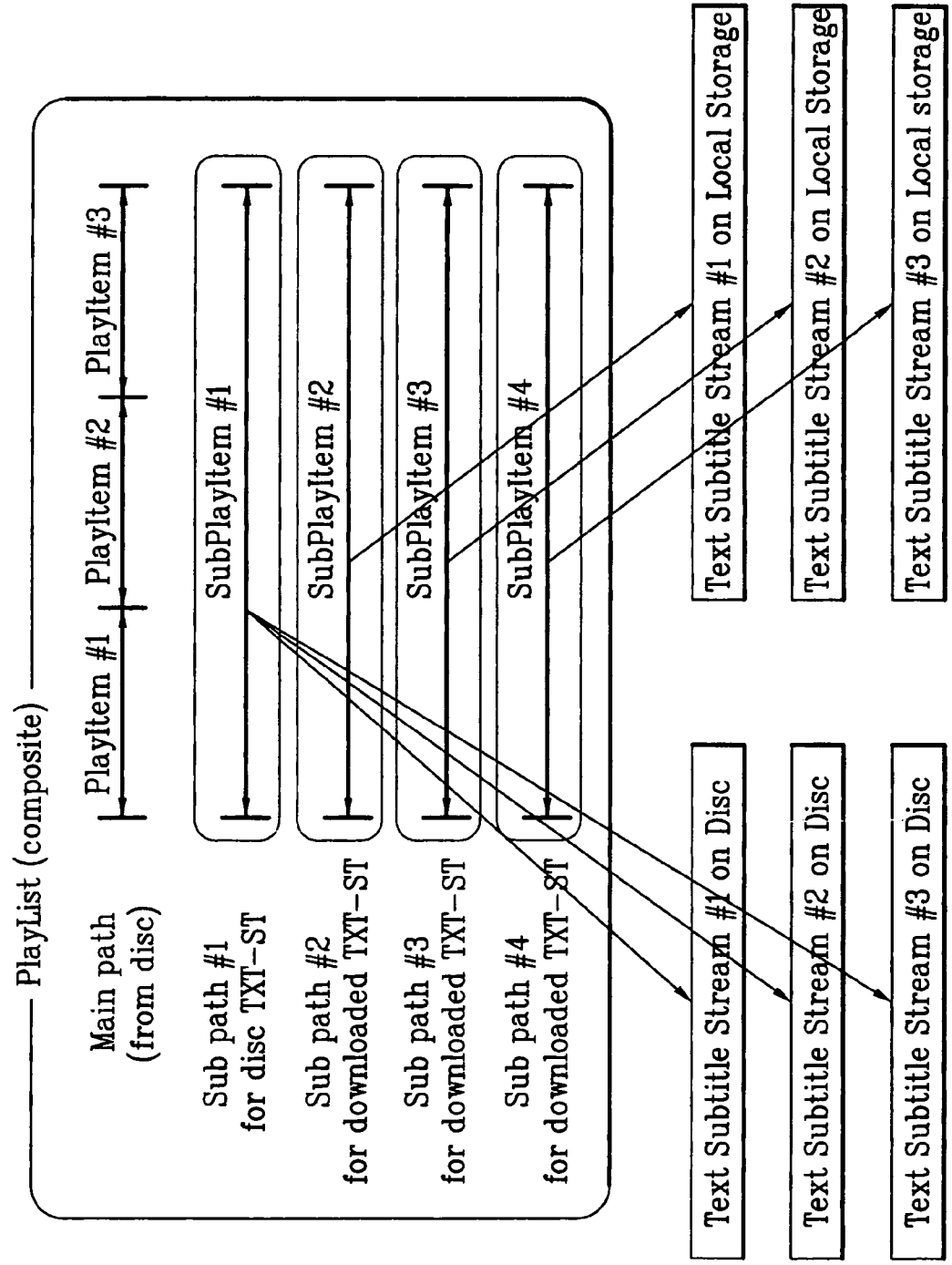
Figure 10B:
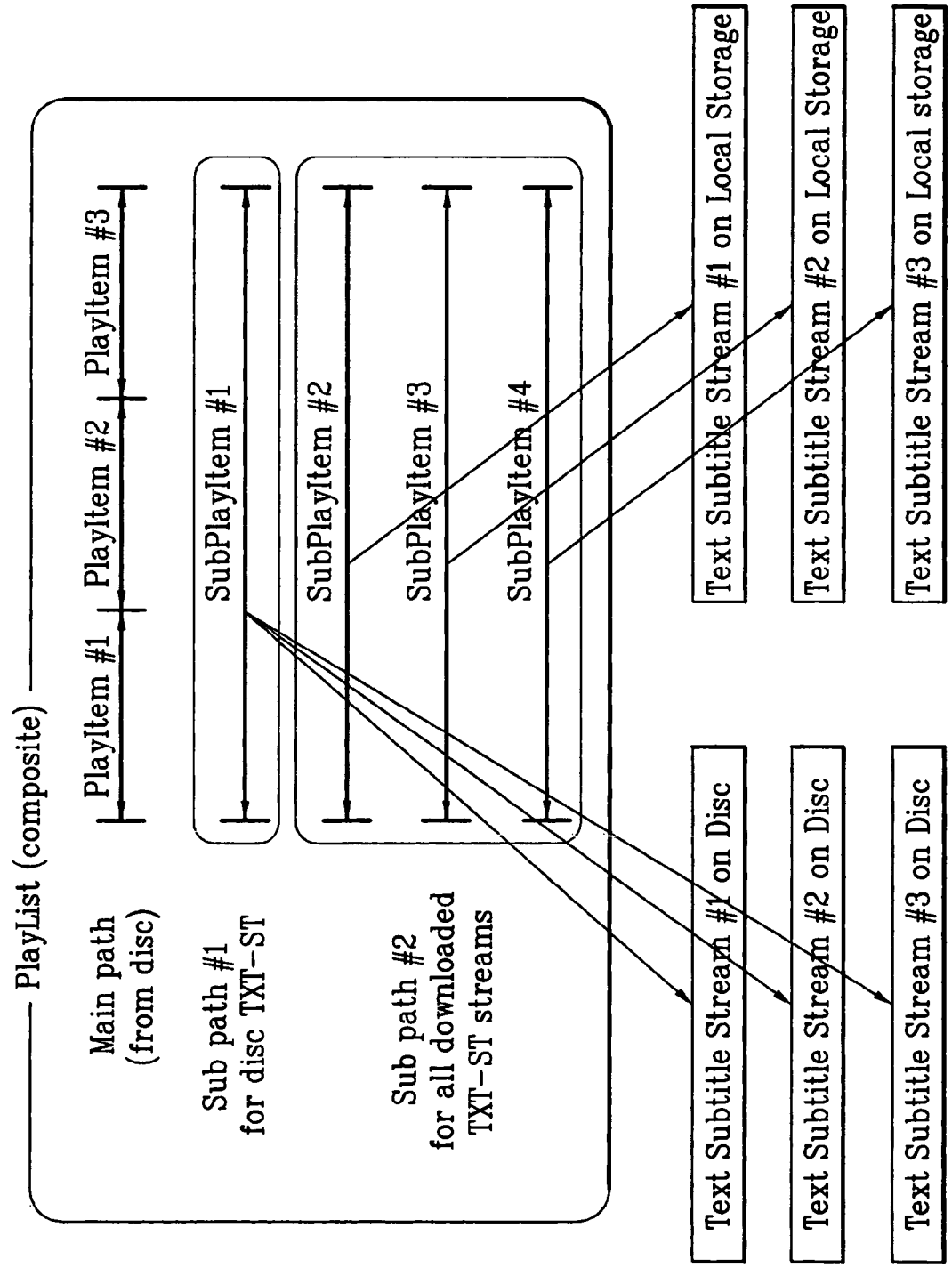
Figure 10C:
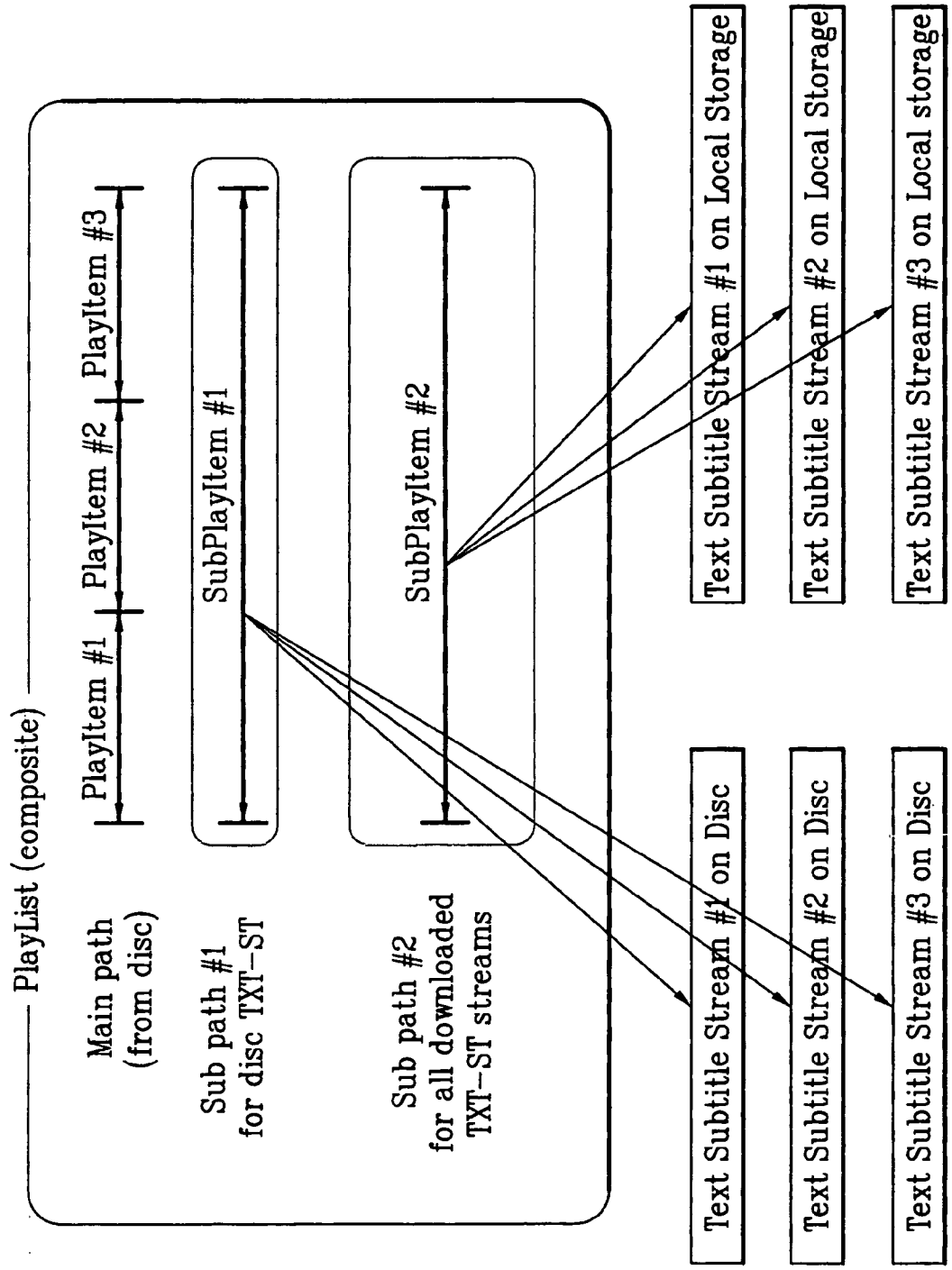
Figure 10E:
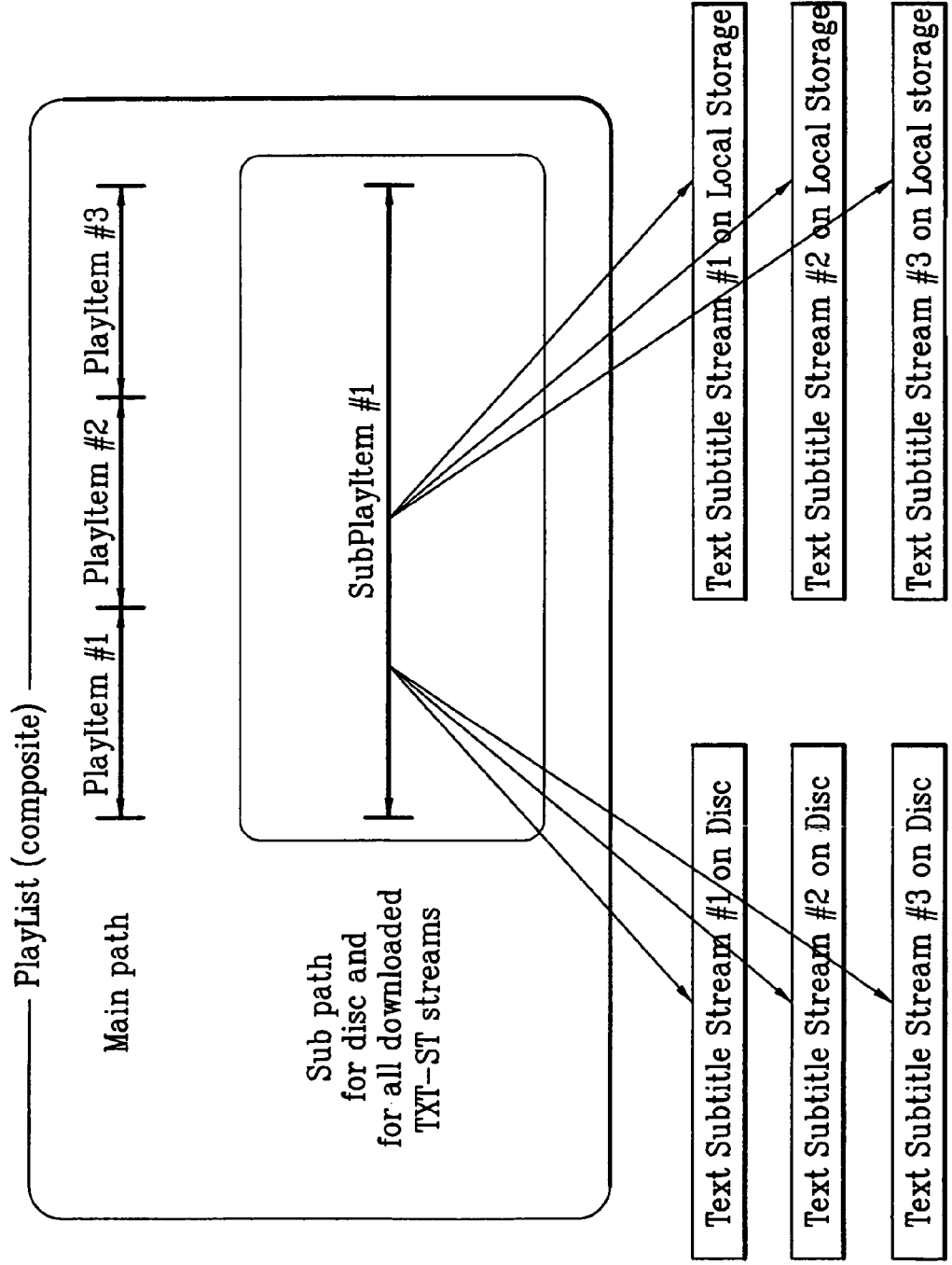

FIG. 8 illustrates an example of the AV stream and the text subtitle stream being provided on a display screen. The text subtitle may either be provided from the main data or be provided by the sub data. FIGS. 9A and 9B illustrate a file structure according to the present invention and a structure of a PlayList file as a reproduction management file for reproducing the text subtitle stream. More specifically, in comparison with FIG. 3A, the text subtitle stream shown in FIG. 9A is configured ob a separate Text subtitle clip which is not multiplexed with the AV stream. Furthermore, referring to FIG. 9B, the reproduction of the Text subtitle clip is managed by a SubPlayItem included in the sub path.

FIGS. 10A to 10E illustrate examples of creating (or configuring) a reproduction management file according to the present invention. Most particularly, FIGS. 10A to 10E illustrate methods, of creating a PlayList for reproducing the text subtitle stream. Accordingly, the examples shown in FIG. 10A to FIG. 10E have the same structure as each of the examples applied in the interactive graphic stream shown in FIG. 6A to FIG. 6E, respectively. However, since the text subtitle stream is reproduced after being synchronized with the main AV stream, as described above, it is apparent that each SubPlayItem provided in the examples shown in FIGS. 10A to 10E has a set of sync information for being synchronized with the AV stream. Therefore, since the examples shown in FIGS. 10A to 10E have the structure as the example shown in FIGS. 6A to 6E, the description of the same will be omitted for simplicity.

FIGS. 11A to 11G illustrate syntaxes of the composite PlayList file for reproducing the sub data stored in the local storage 15 by each hierarchy. FIG. 11A illustrates the syntax of a header portion of the PlayList file (xxxxx.mpls). An identification information, such as an "MPLS" character code, identifying the current file as a PlayList file is recorded in a "type_indicator" field. Information indicating the version of the PlayList file is recorded in a "version_number" field. A position information indicating at which position a "PlayList( )" field starts is recorded in a "PlayList_start_address" field, and a position information indicating at which position a "PlayListMark( )" field starts is recorded in a "PlayListMark_start_address" field. In addition, the PlayList file (xxxxx.mpls) includes an "AppInfoPlayList( )" field, a "PlayList( )" field, and a "PlayListMark( )" field. The "AppInfoPlayList( )" field includes information on the reproduction (or playback) method (i.e., PlayList_playback_type). The "PlayList( )" field includes PlayItem information and Sub path information, and the "PlayListMark( )" field includes a mark pointer which is used for special reproduction (or playback). A detailed description of the "PlayList( )" field according to the present invention will now follow.

FIG. 11B illustrates a header syntax of the "PlayList( )" field included in the PlayList file. Herein, information on the size of the "PlayList( )" field is recorded in a "length" field. Information on the number of PlayItems included in the PlayList file is recorded in a "number_of_PlayItem" field, and information on the number of sub paths included in the PlayList file is recorded in a "number_of_SubPaths" field. Accordingly, "PlayItem( )" fields and "SubPath( )" fields are created based upon the above-described number information. The "PlayItem( )" field includes an "STN_table( )" field, wherein all of the stream information that can be used in the corresponding PlayItem. When reproducing the "PlayItem( )" field and the "SubPath( )" field associated thereto, the optical recording and/or reproducing apparatus 10 may select and reproduce a stream information defined within the "STN_table( )" field. Therefore, all of the above-described stream information (shown in FIG. 6A to FIG. 10E) are recorded in the "STN table( )" field.

Hereinafter, the syntax for the "STN_table( )" field within the "PlayItem( )" field will be described in detail with reference to FIGS. 11C and 11E, and the syntax for the "SubPath( )" field will be described in detail with reference to FIG. 11F. And, a syntax for the "SubPlayItem" field will be described with reference to FIG. 11G. FIG. 11C illustrates a header syntax of the "STN_table( )" field included in the "PlayItem( )" field. More specifically, a size information of the "STN_table( )" field is recorded in a "length" field. The number of reproduceable video streams that are associated with the PlayItem is recorded in a "number_of_video_stream_entries" field, and the number of reproduceable audio streams that are associated with the PlayItem is recorded in a "number_of_audio_stream entries" field. The number of reproduceable text subtitle streams that are associated with the PlayItem is recorded in a "number_of_PG_textST_stream_entries" field. And, finally, the number of reproduceable interactive graphic streams that are associated with the PlayItem is recorded in a "number_of_IG_stream_entries" field. The stream information is recorded in accordance with the above-described number information for each corresponding field. However, each of the stream information respectively recorded to a "stream_entry( )" field and a "stream_attributes( )" field. Herein, stream type, main clip information, and sub clip information are recorded in the "stream entry( )" field, and attribute information of each stream is recorded in the "stream_attributes( )" field.

FIG. 11D illustrates a syntax of a "stream_entry( )" field, which is included in the "STN_table( )" field. More specifically, a size information of the "stream_entry( )" field is recorded in a "length" field, and a source information of the corresponding stream is recorded in a "type" field. For example, type "1" represents a stream type that is included in the main clip and designated by the PlayItem. Type "2" represents a stream type that is designated by the sub path and recorded within the optical disc. And, type "3" represents a stream type that is designated by the sub path and stored in the local storage 15. Therefore, when the type of the current "stream_entry( )" field is "1", a Packet ID (PID) information of the corresponding main clip is recorded in a "ref_to_stream PID_of_mainclip" field. And, when the type of the current "stream_entry( )" field is "2" or "3", a Packet ID (PID) information of the corresponding sub clip is recorded in a "ref_to_stream_PID_of_subclip" field. Evidently, when a plurality of sub paths is included, an identification information of the corresponding sub path is recorded in a "ref_to_SubPath_id" field, and an identification information of the corresponding sub clip is recorded in a "ref_to_Subclip_entry_id" field.

FIG. 11E illustrates a syntax of a "stream_attributes( )" field, which is included in the "STN_table( )" field. More specifically, a size information of the "stream_attributes( )" field is recorded in a "length" field, and information of a stream type is recorded in a "stream_coding_type" field. For example, "stream_coding_type=0x02" represents a video stream (most particularly, an MPEG2 video stream), and an attribute information is recorded in a "frame_rate" field. In addition, "stream_coding_type=0x80 or 0x81 or 0x82" represents an audio stream that is coded to various types. Herein, the attribute information includes an "audio_presentation_type", wherein information on the number of channels when reproducing (or presenting) the audio stream is recorded, and an "audio_language_code" field, wherein a language information of the audio stream is recorded.

Furthermore, "stream_coding_type=0x90" represents a presentation graphic stream. The attribute information includes a "PG_language_code", wherein information of the language used in the presentation graphic is recorded. Also, "stream_coding_type=0x91" represents an interactive graphic stream. The attribute information includes an "IG_language_code", wherein information of the language used in the interactive graphic is recorded. Finally, "stream_coding_type=0x92" represents a text subtitle stream. The attribute information includes a "textST_language_code", wherein information of the language used in the text subtitle is recorded, and a "character_code" field, wherein information of the character code used in the text subtitle is recorded. Accordingly, only a limited type of attribute information for each stream is illustrated in FIG. 11E. However, it is apparent that a wider range of attribute information may be included in each stream type.

FIG. 11F illustrates a header syntax of a "SubPath( )" field that is included in the "PlayList( )" field. More specifically, a size information of the "SubPath ( )" field is recorded in a "length" field, and information of a stream type is recorded in a "stream_coding_type" field, and a source information of the corresponding sub path is recorded in a "SubPath type" field. For example, when SubPath_type "n" represents the sub path recorded within the optical disc, and SubPath_type "m" represents the sub path stored in the local storage 15.

Depending upon the embodiment, a plurality of sub paths may be configured for each stream attribute. In this case, the sub paths types are described in more detail. More specifically, SubPath_type "n1" or "m1" may represent the audio stream, SubPath_type "n2" or "m2" may represent the text subtitle stream, SubPath_type "n3" or "m3" may represent the interactive graphic stream that is not synchronized with the AV stream, SubPath_type "n4" or "m4" may represent the presentation graphic stream, and SubPath_type "n5" or "m5" may represent the interactive graphic stream that is synchronized with the AV stream. Additionally, a flag information indicating whether sub path presentation is to be repeated or not is recorded in a "is_repeat_SubPath" field. The number of SubPlayItems included in the sub path is recorded in a "number_of_SubPlayItems" field. Information corresponding to each SubPlayItem is recorded in a "SubPlayItem( )" field.

FIG. 11G illustrates a syntax of a "SubPlayItem" field that is included in the "SubPath( )" field. More specifically, a size information of the "SubPlayItem( )" field is recorded in a "length" field, and a sub clip name that is managed by the corresponding SubPlayItem is recorded in a "Clip_information_file_name" field, and a coding type of the corresponding clip is recorded in a "Clip_code_identifier" field. An STC_id of the designated sub clip is designated in a "ref_to STC_id" field. And, a presentation start time (IN_time) and a presentation end time (OUT_time) presented (or reproduced) by the SubPlayItem are recorded in a "SubPlayItem_IN_time" field and a "SubPlayItem_OUT_time" field, respectively.

In addition, information identifying whether one or more clips are managed by the SubPlayItem is recorded in a "is_multi_clip_entries" field. Accordingly, the above-described examples include examples when only one interactive graphic clip or text subtitle clip exists within the SubPlayItem, and examples when a plurality of interactive graphic clips or text subtitle clips exists within the SubPlayItem. Therefore, when "is_multi_clip_entries=0b", only one interactive graphic clip or text subtitle clip exists within the SubPlayItem. And, when "is_multi_clip_entries=1b", a plurality of interactive graphic clips or text subtitle clips exists within the SubPlayItem. Accordingly, when "is_multi_clip_entries=1b" represents a plurality of interactive graphic clips or text subtitle clips existing within the SubPlayItem, the corresponding number information is recorded in a "number_of_clip_entries" field. And, information for each of the corresponding number of clips is recorded in the "Clip_information_file_name" field, the "Clip_codec_identifier" field, and the "ref_to_STC_id" field.

Furthermore, among the above-described examples, when the interactive graphic clips or text subtitle clips are required to be synchronized with the main AV stream, a "sync_PlayItem_id" field and a "sync_start_PTS_of_PlayItem" field is used. More specifically, PlayItem identification information (e.g., any one of PlayItem #1, PlayItem #2, and PlayItem #3) associated with a presentation start time of the SubPlayItem is recorded in the "sync_PlayItem_id" field. Also, among the presentation start time of the designated PlayItem, timing information indicating to which time synchronization should be performed is recorded in the "sync_start_PTS_of_PlayItem" field. Therefore, based upon the information recorded in the "sync_PlayItem_id" field and the "sync_start_PTS_of_PlayItem" field, when the presentation of the designated PlayItem reaches a certain time position (i.e., the time recorded in the "sync_start_PTS_of PlayItem" field), the presentation of the SubPlayItem is started, thereby matching the synchronization of the PlayItem and the SubPlayItem.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing video data recorded on a recording medium, the method comprising:
   reading a PlayList file identifying a main path and a sub path of the video data; and
   reproducing main data for the main path and sub data for the sub path according to the PlayList file,
   wherein the PlayList file includes a PlayItem for play-back of the main data and at least one SubPlayItem associated with the PlayItem for play-back of the sub data in association with the play-back of the main data, and the PlayList file further includes a sub path field for the sub path, the sub path field including a sub path type field indicating whether the sub path is synchronized with the main path or not.

2. The method of claim 1, wherein a playing interval identified by the SubPlayItem coincides with an entire portion of a playing interval identified by the PlayItem.

3. The method of claim 1, wherein a playing interval identified by the SubPlayItem coincides with a selected portion of a playing interval identified by the PlayItem.

4. The method of claim 1, wherein the sub data include a first interactive graphic stream synchronous with the main path and a second interactive graphic stream not synchronous with the main path.

5. The method of claim 1, wherein the sub data includes text subtitle streams.

6. The method of claim 1, wherein the PlayItem includes stream type information distinguishing the main data and the sub data from each other.

7. The method of claim 1, wherein the SubPlayItem includes sync information including an identification of the PlayItem and a sync start presentation time in the PlayItem.

8. The method of claim 1, wherein the PlayList file includes a plurality of PlayItems for play-back of the main data.

9. The method of claim 1, wherein the sub path field further includes a field indicating whether the presentation of the sub path is repeated or not.

10. An apparatus for reproducing data recorded on a recording medium, the apparatus comprising:
    a reading unit configured to read data recorded on the recording medium; and
    a controller configured to control the reading unit to read a PlayList file identifying a main path and a sub path of the video data and to read main data for the main path and sub data for the sub path according to the PlayList file, the PlayList file including a PlayItem for play-back of the main data, the PlayList file including at least one SubPlayItem associated with the PlayItem for play-back of the sub data in association with the play-back of the main data,
    wherein the PlayList file further includes a sub path field for the sub path, the sub path field including a sub path type field indicating whether the sub path is synchronized with the main path or not.

11. The apparatus of claim 10, wherein the PlayList file includes a plurality of PlayItems for play-back of the main data.

12. The apparatus of claim 10, wherein the PlayItem includes stream type information distinguishing the main data and the sub data from each other.

13. The apparatus of claim 10, wherein the SubPlayItem includes sync information including an identification of the PlayItem and a sync start presentation time in the PlayItem.

14. The apparatus of claim 10, wherein the sub data include a first interactive graphic stream synchronous with the main path and a second interactive graphic stream not synchronous with the main path.

15. The apparatus of claim 10, wherein the sub path field further includes a field indicating whether the presentation of the sub path is repeated or not.

16. A method for recording data on a recording medium, the method comprising:
   recording a PlayList file which identifies a main path and at least one sub path on the recording medium; and
   recording main data for the main path and sub data for the sub path on the recording medium,
   wherein the PlayList file includes a PlayItem for play-back of the main data and at least one SubPlayItem associated with the PlayItem, and the PlayList file further includes a sub path field for the sub path, the sub path field including a sub path type field indicating whether the sub path is synchronized with the main path or not.

17. The method of claim 16, wherein the PlayItem includes stream type information distinguishing the main data and the sub data from each other.

18. The method of claim 16, wherein the SubPlayItem includes sync information including an identification of the PlayItem and a sync start presentation time in the PlayItem.

19. The method of claim 16, wherein the sub data include a first interactive graphic stream synchronous with the main path and a second interactive graphic stream not synchronous with the main path.

20. The method of claim 16, wherein the sub path field further includes a field indicating whether the presentation of the sub path is repeated or not.

21. An apparatus for recording data on a recording medium, the apparatus comprising:
   a recording unit configured to record data on the recording medium,
   a controller configured to control the recording unit to:
      record a PlayList file which identifies a main path and at least one sub path on the recording medium, and
      record main data for the main path and sub data for the sub path on the recording medium,
   wherein the PlayList file includes at least one PlayItem and at least one SubPlayItem associated with the PlayItem, and the PlayList file further includes a sub path field for the sub path, the sub path field including a sub path type field indicating whether the sub path is synchronized with the main path or not.

22. The apparatus of claim 21, wherein the PlayItem includes stream type information distinguishing the main data and the sub data from each other.

23. The apparatus of claim 21, wherein the SubPlayItem includes sync information including an identification of the PlayItem and a sync start presentation time in the PlayItem.

24. The apparatus of claim 21, wherein the sub data include a first interactive graphic stream synchronous with the main path and a second interactive graphic stream not synchronous with the main path.

25. The apparatus of claim 21, wherein the sub path field further includes a field indicating whether the presentation of the sub path is repeated or not.

26. A optical disc comprising:
   a first area storing a PlayList file identifying a main path and at least one sub path of video data; and
   a second area storing main data for the main path and sub data for the sub path,
   wherein the PlayList file includes at least one PlayItem and at least one SubPlayItem associated with the PlayItem, and the PlayList file further includes a sub path field for the sub path, the sub path field including a sub path type field indicating whether the sub path is synchronized with the main path or not.

27. The optical disc of claim 26, wherein the PlayItem includes stream type information distinguishing the main data and the sub data from each other.

28. The optical disc of claim 26, wherein the SubPlayItem includes sync information including an identification of the PlayItem and a sync start presentation time in the PlayItem.

29. The optical disc of claim 26, wherein the sub data include a first interactive graphic stream synchronous with the main path and a second interactive graphic stream not synchronous with the main path.

30. The optical disc of claim 26, wherein the sub path field further includes a field indicating whether the presentation of the sub path is repeated or not.

* * * * *